(12) United States Patent
Suenaga et al.

(10) Patent No.: US 7,268,898 B2
(45) Date of Patent: Sep. 11, 2007

(54) SYSTEM AND METHOD FOR DATA PROCESSING

(75) Inventors: Yoshiko Suenaga, Kawasaki (JP); Kazuaki Kidokoro, Yokohama (JP); Hiroyuki Kato, Ichikawa (JP); Akihiko Fujiwara, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 912 days.

(21) Appl. No.: 10/208,872

(22) Filed: Aug. 1, 2002

(65) Prior Publication Data

US 2004/0024728 A1  Feb. 5, 2004

(51) Int. Cl.
*G06F 15/00* (2006.01)
(52) U.S. Cl. .................................... 358/1.13; 358/1.15
(58) Field of Classification Search ............... 358/1.13, 358/1.15; 709/218, 223; 710/1, 52, 120; 382/238; 715/516, 823; 270/58.11, 58
See application file for complete search history.

(56) References Cited

U.S. PATENT DOCUMENTS 5,287,194 A * 2/1994 Lobiondo .................... 358/296
6,687,018 B1 * 2/2004 Leong et al. ............... 358/1.15
2002/0041386 A1 * 4/2002 Suzuki et al. ............... 358/1.13
2003/0002069 A1 * 1/2003 Bhogal et al. .............. 358/1.15

FOREIGN PATENT DOCUMENTS

JP  7-084748  3/1995
JP  8-202607  8/1996

* cited by examiner

*Primary Examiner*—King Y. Poon
*Assistant Examiner*—Saeid Ebrahimi, I
(74) *Attorney, Agent, or Firm*—Foley & Lardner LLP

(57) ABSTRACT

In a data processing system in which data to be processed is managed as processing-object data, and the processing-object data is processed in response to a designation, there are provided: data management means for managing the processing-object data together with processing-object attribute information indicative of an attribute thereof; processing designation means for designating a processing with respect to the processing-object data through a dialog performed with the user; processing execution means for executing a processing of the processing-object data in response to a designation performed by the processing designation means; and first processing result forecasting means for executing, when the dialog is performed, a forecast on a result of the processing by comparing processing-subject attribute information, which indicates an attribute of a processing to be executed by the processing execution means, with the processing-object attribute information, and for outputting to the user forecast notification information in accordance with the result of the processing obtained through the forecast.

14 Claims, 20 Drawing Sheets

Fig.7

```
Folder1¥
        Document1.tiff
        Document1.Properties
        Folder2¥
                Document2.pdf
                Document2.Properties
        Folder3¥
                Document3_Page1.jpg
                Document3_Page2.jpg
                Document3_Page3.jpg
                Document2.Properties
```

Fig.8

```
<Document>
        <Properties>
                <ColorMode>BW</ColorMode>
                <PaperSize>A4</PaperSize>
                <Resolution>200</Resolution>
                <Duplex>None</Duplex>
                <InputTray>1</InputTray>
                <OutputTray>1</OutputTray>
                <MediaType>Normal</MediaType>
                <Alternation>None</Alternation>
                <Copies>1</Copies>
                <Pages>10</Pages>
                <SortMode>Sort</SortMode>
                <Staple>UpperLeft</Staple>
                <HolePunch>Left</HolePunch>
                <Exposure>0</Exposure>
                <DataSize>100</DataSize>
                <EmailMaxSize>20</EmailMaxSize>
        <Properties>
</Document>
```

Fig.9

```
<Document>
    <Properties>
        <ColorMode>Color24bit</ColorMode>
        <PaperSize>A4</PaperSize>
        <Resolution>600</Resolution>
        <Duplex>Book</Duplex>
        <InputTray>1</InputTray>
        <OutputTray>1</OutputTray>
        <MediaType>Normal</MediaType>
        <Alternation>None</Alternation>
        <Copies>1</Copies>
        <Pages>10<Pages>
        <SortMode>Sort</SortMode>
        <Staple>UpperLeft</Staple>
        <HolePunch>Left</HolePunch>
        <DataSize>100</DataSize>
    <Properties>
</Document>
```

Fig.10

```
<Document>
    <Properties>
        <ColorMode>Color8</ColorMode>
        <PaperSize>A4</PaperSize>
        <Resolution>200</Resolution>
        <Duplex>Book</Duplex>
        <MediaType>Thick</MediaType>
        <Copies>1</Copies>
        <Pages>10<Pages>
        <Exposure>0</Exposure>
        <DataSize>100</DataSize>
    <Properties>
</Document>
```

Fig.11

```
<Document>
    <Properties>
            <ColorMode>BW</ColorMode>
            <PaperSize>A4</PaperSize>
            <Resolution>200</Resolution>
            <Copies>1</Copies>
            <Pages>10<Pages>
            <DataSize>100</DataSize>
            <From>+81-44-548-5749</From>
            <Sender>TOSHIBA</Sender>
            <SubCode>12345</SubCode>
    <Properties>
</Document>
```

Fig.12

```
<Document>
    <Properties>
            <ColorMode>Color8bit</ColorMode>
            <PaperSize>A4</PaperSize>
            <Resolution>200</Resolution>
            <Copies>1</Copies>
            <Pages>10</Pages>
            <DataSize>100</DataSize>
            <From>aaa@toshibatec.co.jp</From>
            <To>bbb@toshibatec.co.jp</To>
            <Cc>ccc@toshibatec.co.jp,ddd@toshibatec.co.jp</Cc>
    <Properties>
</Document>
```

Fig.13

```xml
<Printer>
    <Capability>
        <ColorMode>
            <Value>BW</Value>
            <Value>Grayscale8</Value>
            <Value>Color2</Value>
            <Value>Color8</Value>
            <Value>Color24</Value>
        </ColorMode>
        <PaperSize>
            <Value>A3</Value>
            <Value>A4</Value>
            <Value>A5</Value>
            <Value>B4</Value>
            <Value>B5</Value>
            <Value>LD</Value>
            <Value>LG</Value>
            <Value>LT</Value>
        </PaperSize>
        <Resolution>
            <Value>200</Value>
            <Value>300</Value>
            <Value>600</Value>
        </Resolution>
        <Duplex>
            <Value>Book</Value>
            <Value>Tablet</Value>
        </Duplex>
        <InputTray>
            <Value>1</Value>
            <Value>2</Value>
            <Value>3</Value>
            <Value>LCF</Value>
            <Value>Bypass</Value>
        </InputTray>
        <OutputTray>
            <Value>1</Value>
            <Value>2</Value>
        </OutputTray>
        <MediaType>
            <Value>Normal</Value>
            <Value>Thick</Value>
        </MediaType>
        <Alternation>ON</Alternation>
        <Copies>999</Copies>
        <Pages>9999</Pages>
        <Staple>
            <PaperSize value="A3>
                <Value>UpperLeft</Value>
                <Value>TopDouble</Value>
                <Value>UpperRight</Value>
            </PaperSize>
            <PaperSize value="A4">
                <Value>UpperLeft</Value>
                <Value>UpperRight</Value>
                <Value>LeftDouble</Value>
            </PaperSize>
        </Staple>
        <HolePunch>
            <PaperSize value="A3">
                <Value>Top3Hole</Value>
            </PaperSize >
            <PaperSize value="A4">
```

Fig.14

```
<Fax>
    <Capability>
        <ColorMode>
            <Value>BW</Value>
        </ColorMode>
        <Papersize>
            <Value>A3</Value>
            <Value>A4</Value>
            <Value>B4</Value>
            <Value>LD</Value>
            <Value>LG</Value>
            <Value>LT</Value>
        </PaperSize>
        <Resolution>
            <Value>100</Value>
            <Value>200</Value>
            <Value>400</Value>
        </Resolution>
    </Capability>
</Fax>
```

Fig.15

```
<Mail>
    <Capability>
        <MailSize>20MB</MailSize>
        <Domain>toshiba</Domain>
        <Format>
            <Value>TIFF</Value>
            <Value>PDF</Value>
        <Format>
        <PartialMessage>2MB</PartialMessage>
    </Capability>
</Mail>
```

SYSTEM AND METHOD FOR DATA PROCESSING

BACKGROUND OF THE INVENTION

1. Field of the Invention

The present invention relates to a data processing system and a data processing method. The present invention is preferably used for, for example, a dialog performed when a document file, which has been previously managed, is processed.

2. Description of Related Art

In recent years, in the fields of document management system and job management system, many user-friendly systems have been proposed. Examples of such systems include a system which temporarily stores a document, which is inputted from the input means connected to the system, and allows the user to process the stored document via a user interface (hereinafter, user interface occasionally referred to as "UI").

Japanese patent application laid-open (Kokai) gazette 7-84748 (No. 84748/1995) (literature 1) proposes an invention in which an icon indicative of a device is allocated to a folder, and the icon displayed is switched by the device depending on whether or not the device is in a usable state, thereby showing the user intelligibly whether or not the device is in a usable state. Literature 1 proposes another invention in which icons each representing a job are defined, and when a document is dropped on one of the icons, the processing of the job allocated to the icon is performed.

On the other hand, there is proposed a system which automatically selects, when the system processes an input document, a device suitable for the document.

Japanese patent application laid-open (Kokai) gazette 8-202607 (No. 202607/1996) (literature 2) proposes an invention of a filing system. In this invention, processings to be performed, such as facsimile transmission, mail transmission, image transformation, and printing, are stored beforehand in a document storage area, and when a document is prepared in the storage area, a specified processing is performed. However, this invention does not provide a user interface (UI) through which the user can process a document thus temporarily stored.

Meanwhile, in many cases, even though processing devices connected to a system are common in their basic functions, their detailed features (functional specifications) are different. For example, in the case of printers, even though several printers have commonly the same "printing function", their detailed functional specifications are different, depending on the respective printers, with respective to color/monochrome, resolution, sheet size, image drawing area, allowable position for stapling, allowable position for hole punching (i.e., hole piercing), and the like. Similarly, in the case of scanners, the ranges (i.e., their detailed functional specifications) supported by the respective devices are different with respect to color/monochrome, resolution, sheet size, and so on; in the case of facsimile machines, the ranges supported by the respective devices are different with respect to resolution, compression form, and so on.

Further, even where the functions of the respective devices are constituted not as hardware devices but as software modules, their functional specifications are different. For example, mail servers, each having a mail transmission function, have different maximum data transmission volumes depending on the respective mailer servers.

When the user intends to process a document, he fails, in some cases, to obtain his desired results due to the difference in functional specifications. Examples of such a case include: a case where, although an intended processing was color printing, the actually executed printing is printing as black and white; a case where, although the intended processing was facsimile transmission in a super fine mode, the actually executed processing is transmission in a standard mode; and a case where, although the user thinks he succeeded in transmitting an E-mail, a size excess error occurs and an error mail is returned.

In such cases, the user needs to perform the processing again. Accordingly, such a reattempt requires the user to take much time, in particular, when the data amount of the document is large. Also, repeated retrials to avoid such errors require him to take much labor.

Further, the invention of the literature 2 is so configured that the function of automatically judging the devices to be used is provided for the purpose of enhancing efficiency of the processing. However, according to this automatic judgment algorithm, judgment results are obtained on the basis of previously provided judgment criteria, so that this configuration does not ensure that the judgment result is always optimum (or acceptable) to the user.

For example, the printer selected by the system may be a printer having the highest resolution out of the printers having resolutions suitable for the document; however, in view of the fact that the printer selected by the system is located remotely from the user, he may wish to select a printer located just near him even though the nearby printer has a slightly lower resolution.

In short, the function of automatically selecting a device may be useful for reducing the operational load applied to the user when performing the processing, but the automatic selecting function does not necessarily ensure that the device thus selected provides his truly desired processing.

SUMMARY OF THE INVENTION

In view of the above-mentioned problems, an object of the present invention is to provide, through a dialog which is performed at the time when the user designates a processing and in which a result of the processing is forecasted and notified to him, him with an opportunity to review the content of the designation so as to reduce the operational load which is applied to him until he finally obtains a satisfactory processing result.

A first aspect of the present invention provides a data processing system in which data to be processed is managed as processing-object data, and the processing-object data is processed in response to a designation, comprising:

data management means for managing the processing-object data together with processing-object attribute information indicative of an attribute thereof;

processing designation means for designating a processing with respect to the processing-object data through a dialog performed with the user;

processing execution means for executing a processing of the processing-object data in response to a designation performed by the processing designation means; and first processing result forecasting means for executing, when the dialog is performed, a forecast on a result of the processing by comparing processing-subject attribute information, which indicates an attribute of a processing to be executed by the processing execution means, with the processing-object attribute information, and for outputting to the user forecast notification information in accordance with the result of the processing obtained through the forecast.

A second aspect of the present invention provides a data processing method in which data to be processed is managed as processing-object data, and the processing-object data is processed in response to a designation, comprising:

managing the processing-object data together with processing-object attribute information indicative of an attribute thereof by using data management means;

designating a processing with respect to the processing-object data through a dialog performed with the user;

executing a processing of the processing-object data in response to a designation performed by the processing designation means; and executing a forecast, which is executed by first processing result forecasting means when the dialog is performed, on a result of the processing by comparing processing-subject attribute information, which indicates an attribute of a processing to be executed by the processing execution means, with the processing-object attribute information, and outputting to the user forecast notification information in accordance with the result of the processing obtained through the forecast.

BRIEF DESCRIPTION OF THE DRAWINGS

FIG. 7 is a schematic view showing a structure of a folder according to the embodiment of the present invention;

FIG. 8 is a schematic view showing an example of attribute information of a document according to the embodiment of the present invention;

FIG. 9 is a schematic view showing another example of attribute information of a document according to the embodiment of the present invention;

FIG. 10 is a schematic view showing still another example of attribute information of a document according to the embodiment of the present invention;

FIG. 11 is a schematic view showing still anther example of attribute information of a document according to the embodiment of the present invention;

FIG. 12 is a schematic view showing still another example of attribute information of a document according to the embodiment of the present invention;

FIG. 13 is a schematic view showing an example of attribute information of a module (document processing module) according to the embodiment of the present invention;

FIG. 14 is a schematic view showing another example of attribute information of a module according to the embodiment of the present invention;

FIG. 15 is a schematic view showing still another example of attribute information of a module according to the embodiment of the present invention;

BEST MODE FOR CARRYING OUT THE INVENTION

Hereinafter, a best mode of a data processing system and a best mode of a data processing method, both according to the present invention, will be described with reference to the attached drawings.

Figure 1:
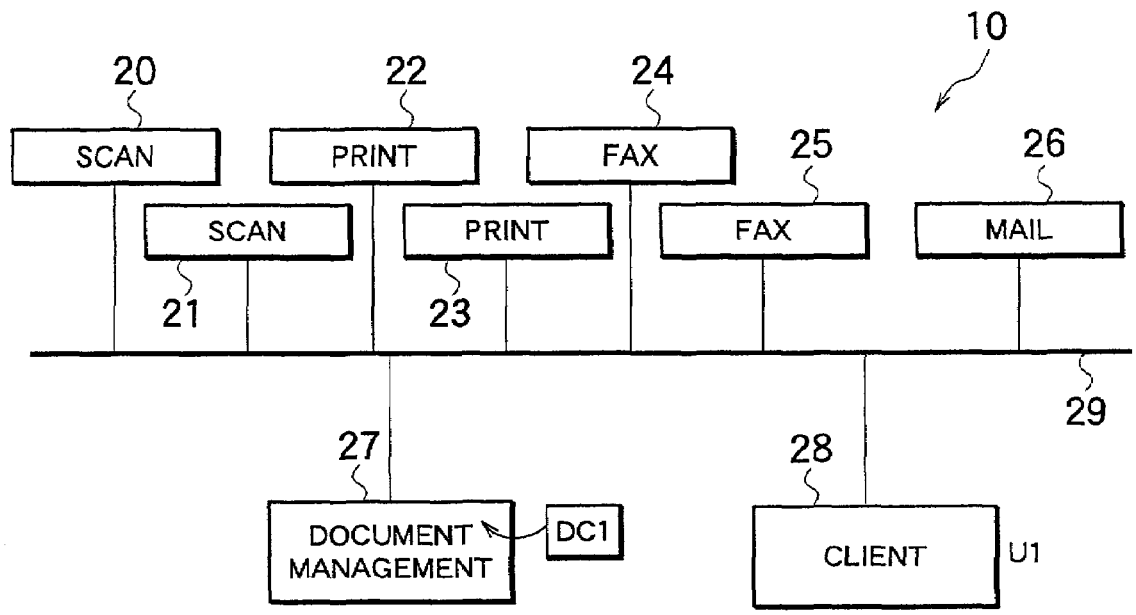
FIG. 1 is a schematic view showing a configuration of a document processing system according to an embodiment of the present invention.

The overall configuration of a document processing system 10 according to the present embodiment is shown in FIG. 1. The document processing system 10 constitutes one LAN (local area network).

In FIG. 1, the document processing system 10 includes scanner terminals 20 and 21, printer terminals 22 and 23, facsimile terminals 24 and 25, a mail terminal 26, a document management terminal (document management server) 27, a client terminal 28, and a transmission line 29 which connects these devices with one another.

More particularly, each of the scanner terminals 20 and 21 is a unit which is adapted to basically transform characters, figures, or the like recorded on a recording medium, such as paper, into electronic data; detailed functional specifications thereof (i.e., the above-mentioned color/monochrome, resolution, sheet size, and so on) being different depending on the machine types of the scanner products employed therefor. It is assumed here that the scanner terminals 20 and 21 are constituted by scanner products which mutually have different machine types and different functional specifications.

Next, each of the printer terminals 22 and 23 is a unit which is adapted to basically output in the form of printing (hereinafter output in the form printing will be occasionally referred to as "print-output") in accordance with electronic data supplied thereto; detailed functional specifications thereof (the above-mentioned color/monochrome, resolution, sheet size, image drawing area, allowable position for stapling, and allowable position for hole punching (hole piercing)) being different depending on the machine types of printer products employed therefor. It is assumed here that the printer terminals 22 and 23 are printer products which mutually have different machine types and different functional specifications.

Similarly, each of the facsimile terminals 24 and 25 is a unit which basically has: a transmitting function of transforming characters or figures recorded on a recording medium, such as paper, to electronic data, transmitting the electronic data to a destination terminal, and causing the destination terminal to generate a hard copy; and, to the contrary, a receiving function of generating a hard copy on the basis of electronic data received from a source terminal. Here, the transmitting function is noted.

It is assumed here that the functional specifications of the facsimile terminals 24 and 25 are mutually different, because it is usual that detailed functional specifications (e.g., the above-mentioned resolution, compression form, etc.) of the facsimile terminals 24 and 25 are mutually different according to the machine types of facsimile machine products.

The mail server 26 is a server which is adapted to basically transmit and receive electronic mails. When transmitting an electronic mail, the server 26 functions as a SMTP (simple mail transfer protocol) server; when receiving an electronic mail, the server 26 functions as a POP (post office protocol) server. Here, the aspect of a SMTP server is noted. In FIG. 1, among the document processing modules 20 to 26, with respect to the mail server 26 only, the number thereof is one. However, not to mention, there may be provided, as required, two or more mail servers which have mutually different functional specifications.

The client terminal 28 is a unit which functions as a client of the above-mentioned scanner terminals 20 and 21, printer terminals 22 and 23, facsimile terminals 24 and 25, and mail server 26. The client terminal 28 is constituted by a personal computer or the like which has a network function. Not to mention, within the document processing system 10, there may exist a plurality of client terminals other than the client terminal 28.

The document management terminal (document management module) 27 is a unit which is adapted to register and manage documents (for example, document DC1) to be treated in the present embodiment, in such a manner that the documents are managed uniformly in accordance with a folder structure as shown in, for example, FIG. 7. In other words, within the document processing system 10, only the document management terminal 27 registers and manages the document DC1.

Accordingly, when the client terminal 28 sends the printers 22 and 23, facsimile terminals 24 and 25, or the like a request for performing a processing (for example, printing, facsimile transmission, electronic mail transmission, or the like) related to the document DC1, the sending of the request is performed by way of the document management terminal 27. To the contrary, when the scanner terminal 20 or 21 obtains electronic data, the electronic data is registered as the document DC1 within the document management terminal 27, and thereafter the document DC1 is managed under the document management terminal 27.

In the folder structure in FIG. 7, the documents are managed in a manner that the documents are classified into a plurality of folders. The folders can be arranged in a manner that a plurality of folders are prepared at the same hierarchical layer, and also that a folder contains a lower folder prepared at its lower hierarchical layer. Each of the documents stored in the folders is constituted by document data (body of the document, namely, the concrete contents of description of the document) and an attribute which the document has (document attribute information). Each document is managed in a manner that these two types of information are contained in two separate files, respectively ("Document1.tiff" and "Document1.Properties"). A file name is constituted by a name which uniquely identifies a file, such as "Document1", and an extension identifier which shows the type of the information, such as "tiff" and "Properties".

Not to mention, the documents may be managed, not by using files, but by using a table structure while employing a conventional technique, such as relational data base.

The document data may be managed in a manner that one file is prepared for a plurality of pages, or in a manner that one file is prepared for each page. When one file is prepared for each page, the file is assigned with a file name which identifies the page, such as "Document1_Page1.jpg".

Note that the documents, which the document management terminal 27 registers and manages, include, in addition to image data denoted by the extensions "*.tiff" and "*.jpg" shown in FIG. 7, XML-form data (document attribute information) denoted by "*.properties".

Not to mention, the client terminal 28, which is constituted by a personal computer or the like, may be so configured that the terminal has a hard disk or the like of its own to store and manage the document DC1 by itself. Further, the client terminal 28 is originally so configured that the terminal 28 communicates directly with the document processing modules 20 to 26, each of which serves as a functional unit (i.e., module) for processing a document, so as to send each of the modules a request for performing a processing as to a document. However, in the present embodiment, it is preferred that the client terminal 28 sends the request via the document management terminal 27, because, when this request is sent, it is necessary to perform a dialogue (additional dialog), which is not performed in conventional art.

In other words, when the client terminal 28 sends a request not passing through the document management terminal 27 (for example, a printing request sent directly to the printer terminal 22 or 23), there is a probability that it will be difficult to perform the additional dialog. However, where the document management terminal 27 has a function of monitoring the fact that the client terminal 28 has sent a request not passing through the document management terminal 27, it will be possible to realize the additional dialog even when a request not passing through the terminal 27 is made.

In the conventional dialog, which is performed at this occasion, merely designation of a processing is performed. By contrast, the additional dialog of the present embodiment makes it possible to present before the user the difference between his desired result and a processing result expected to be obtained when the processing is actually performed, to allow him to confirm whether he should continue the processing or should make an alteration to any one of the attributes, so as to enable him to process the document safely, thereby providing him with his desired result with as few steps as possible.

On the other hand, it is assumed here that the document processing modules 20 to 26 within the document processing system 10 are constituted by conventional ones. This is because the document processing system 10 can be configured more easily when the document processing modules 20 to 28 are constituted by utilizing conventional ones as they are as much as possible.

In this case, it is necessary to configure the system in a manner that the client terminal 28 is prohibited from sending a request for performing a processing as to a document directly to the document processing modules 20 to 26, and concurrently that the request is invariably performed via the document management terminal 27 (if necessary, the system may be so configured that, in response to the user's operation, the operating state can be changed to a state in which the request can be sent directly to the document processing modules 20 to 26.). In order that the request is performed invariably via the document management terminal 27, it is necessary to configure the system by appropriately setting the client terminal 28 (or by installing a new software) in a manner that the request generated from the client terminal 28 is firstly sent to the document management terminal 27.

Figure 28:
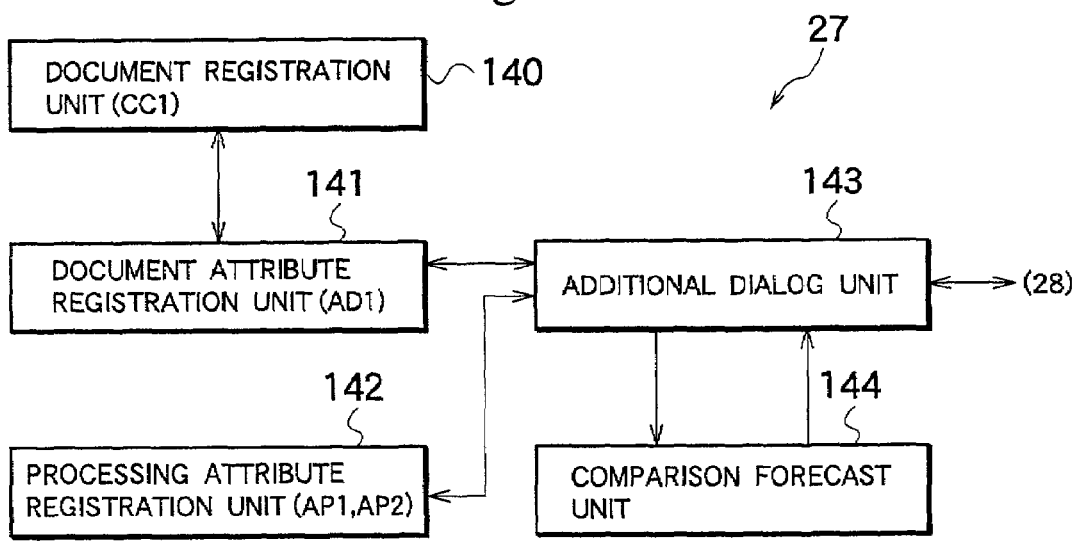
FIG. 28 is a schematic view showing a configuration of the main portion of a document management terminal (document management module) according to the embodiment of the present invention.

FIG. 28 shows a configuration of the document management terminal 27.

In FIG. 28, the document management terminal 27 includes a document registration unit 140, a document attribute registration unit 141, a processing attribute registration unit 142, an additional dialog unit 143, and a comparison forecast unit 144.

More particularly, the document registration unit 140 is a unit which is adapted to store a body of each document, such as the above-mentioned document DC1. Each of the documents stored in the document registration unit 140 is usually managed in the above-mentioned file form. The document data CC1 shown in FIG. 28 is a document data of the document DC1.

The attribute registration unit 141 is a unit which is adapted to register document attribute information, which is a list of attribute information of the documents registered in the document registration unit 140. The content of the document attribute registration unit 141 can be added, deleted, or altered corresponding to the contents of the document registration unit 140. Accordingly, the document attribute information AD1, which is document attribute information of the document DC1, is registered in the document attribute registration unit 141

The document attribute information may be data of any format. For example, "attribute name=attribute value" may be described in the form of a list. However, it is assumed here that the document attribute information is structured by using tags.

This tag-structured data format, which is prevalently used in markup languages represented by XML (extensible markup language), has a structure in which each data is marked up (namely, it is shown what type of data the data existing in the indicated portion is) by enclosing an opening tag and a closing tag, each tag being enclosed by the symbols "< >". In the tag-structured data format, a hierarchical structure can be described by arranging tags in a nested structure.

Examples of the document attribute information, each of which is structured by using tags, are illustrated in FIGS. 8 to 11.

Specifically, FIG. 8 shows an example of the document attribute information; FIG. 9 shows an example of the document attribute information as to the document obtained from a virtual printer driver and stored; and FIG. 10 shows an example of document attribute information as to a document which is scanned and stored. The document attribute information shown in FIG. 10 is obtained in a manner that the set values, which are used when the scanner terminal (for example, terminal 20) read the document, are set and registered as the attribute values thereof.

Similarly, FIG. 11 shows document attribute information as to the document which a facsimile terminal (e.g., the terminal 24) has received via facsimile transmission and stored. The document attribute information is obtained in a manner that the document information, which is received from the facsimile terminal of transmission source at the time of arrival of a facsimile transmission, is set and registered as the attribute values thereof.

FIG. 12 shows an example of document attribute information as to the document which is received via E-mail and stored. The document attribute information is obtained in a manner that information, which is attached under the E-mail when the mail server 26 received the document, is set and registered as the attribute values.

FIGS. 8 to 12 are common in many respects.

For example, the portion lying between document tags, namely, an opening tag <Document> and an closing tag </Document>, denotes the whole of a document (Document). Within the portion of the whole of a document; the portion lying between the attribute tags, namely, an opening tag <Properties> and a closing tag </Properties>, denotes document attribute information, which constitutes a part of the document. The body of the document (concrete contents of description of the document), which is, not to mention, included in the document but not shown in FIGS. 8 to 12, is preferred to be so configured as to exist in the document registration unit 140 rather than in the document attribute registration unit 141, as described above.

Here, the configuration in which the first opening tag <Document> is followed by the next opening tag <Properties> shows that the document attribute information is described at a lower layer in a tree structure. As necessary, the nested structure as adopted in the upper layer may be repeated in the lower layer; however, in the examples shown in these figures, such repetitions of the nested structure do not exist in the lower layer, and instead the respective concrete attributes, which are constituent elements of the document attribute information, are listed within the same lower layer.

That is, the attribute name and its attribute value are described by adopting the arrangement in which an attribute name is put as a tag name and an attribute value is disposed between an opening tag and a closing tag.

For example, in FIG. 8, between the opening tag <ColorMode> of the attribute name "ColorMode" and its closing tag </ColorMode>, an attribute value BW (black and white) is disposed. Similarly, between the opening tag <PaperSize> of the attribute name "PaperSize" and its closing tag </PaperSize>, an attribute value of A4 (i.e., A4 size) is disposed.

The foregoing explanation is applicable to the other portions in FIG. 8, and to FIGS. 9 to 15.

Note that, for example in FIG. 9, with respect to the attribute of reading density "Exposure", which is not generated in the printer driver, the data format is so configured that absence of the tag having the name of the attribute does not cause a mismatch as data format.

On the other hand, the processing attribute registration unit 142 is a unit which is adapted to register processing attribute information. The processing attribute information is a list of attribute information as to a processing to be performed by each of the document processing modules 20 to 26 which are connected to the transmission line 29 within the document processing system 10. Accordingly, for example, attribute information AP1, which is processing attribute information of the printer terminal 22, and attribute information AP2, which is the processing attribute information of the printer terminal 23, are also registered in the processing attribute registration unit 142.

The processing attribute registration unit 142 obtains processing attribute information in ways different from those employed for obtaining document attribute information. More particularly, in the case of the document attribute registration unit 140, when the document is registered in the document registration unit 140, the following information is employed as the document attribute information. Specifically, the set value used when the scanner terminal read the document can be employed as the document attribute information; the document information, which is obtained from the facsimile terminal of transmission-source when the facsimile terminal receives facsimile transmission, can be employed as the document attribute information; management information as to a file, which is obtained when a document is received in the form of a file, can be employed as the document attribute information. By contrast, in the case of the processing attribute registration unit 142, the processing attribute information is obtained in different ways.

For example, where each of the document processing module 20 to 26 has a function of transmitting its own processing attribute information through autonegotiation or the like, the processing attribute registration unit 142 can easily obtain the processing attribute information by using the function. By contrast, where each module does not have such a function, the processing attribute registration unit 142 obtains the processing attribute information in a manner that, each time the configuration of the document processing system 10 is changed (for example, when a new printer is added, or when the existing facsimile terminal (e.g., the facsimile terminal 24) is disconnected), the administrator or the like of the document processing system 10 needs to add, delete, or modify the processing attribute information in the processing attribute registration unit 142 through his setting operation.

The processing attribute information may be data of any format. For example, "attribute name=attribute value" may be described in the form of a list; however, it is assumed here that the file is structured by using tags as in the case of the document attribute information.

Examples of the processing attribute information, which is structured by using tags, are illustrated in FIGS. 13 to 15.

Specifically, FIG. 13 shows a part of the processing attribute information of a printer terminal (e.g., terminal 22), FIG. 14 shows processing attribute information of a facsimile terminal (e.g., terminal 24), and FIG. 15 shows processing attribute information of a mail server (here, terminal 26).

Although each of the data formats of the processing attribute information, which are shown in FIGS. 13 to 15, is the same as the data format of the document attribute information; attribute names of the processing attribute information include attribute names different from those in the document attribute information.

For example, each tag labeled the attribute name of "Capability" shows detailed functional specifications of the concerned document processing module in a manner that, under the "Capability" tag, further attribute names and settable values for each of the further attribute names are described in the form of a list.

Further, a plurality of attribute values, all of which are positioned in a portion marked up by a pair of tags labeled a same attribute name and each of which is disposed between a separate pair of tags labeled the attribute name of "Value" (for example, in FIG. 13, BW, Grayscale8, Color2, Color8 and Color24, all of which are positioned in a portion marked up by the pair of ColorMode tags and each of which is disposed between the pair of Value tags), show that, with respect to the marked-up attribute, there are a plurality of eligible functional specifications (attribute values) which the document processing module (here, printer terminal) can provide. In the case of FIG. 13, with respect to the marked-up attribute of color mode, black and white (BW) of binary values, gray scale of 8 bits, color of binary values, color of 8 bits, and color of 24 bits, are eligible functional specifications (attribute values), so that printing can be performed at any one of these functional specifications (attribute values).

Similarly, FIG. 13 shows that A3, A4, and so on can be set as sheet size; that any number of 999 or below can be set as number of copies; and that any number of 9999 or below can be set as number of pages. Also, FIG. 13 shows that positions for stapling can be set according to sheet sizes: in the case of A3, settable positions are upper left, top (double staples), and upper right; and in the case of A4, settable positions are upper left, upper right, and left (double staples). Further, FIG. 13 shows that positions for hole punching can be set according to sheet sizes: in the case of A3, a settable position is upper (three holes); and in the case of A4, a settable position is left (two holes).

Here, a configuration is adopted in which, with respect to an attribute which the printer terminal does not have, such as double-sided printing, stapling, etc., description itself of a tag for the attribute is omitted. Accordingly, the comparison forecast unit 144 of the document management terminal 27 can judge, by checking whether or not a tag labeled a name of a desired attribute exists, whether or not detailed functional specifications (attribute values) of the desired attribute is provided in the document processing module (for example, the printer terminal 22).

Similarly to FIG. 13, FIG. 14, showing detailed functional specifications of a facsimile terminal, illustrates transmittable sheet sizes, and also illustrates resolutions at the time of transmission.

Further, FIG. 15, showing functional specifications of a mail server, illustrates the maximum size of the data of a mail which the mail server 26 can transmit, and formats of a file which can be attached under the mail.

Note that each of FIGS. 13 to 15 does not include an attribute as to a location of each document processing module (i.e., location information indicative of where the document processing module is geographically located).

The location information is not so much needed in the case where the document processing module is the mail server 26 or the like. This is because both of the input and output data treated by the document processing module are electronic data (in this case, electronic mail). By contrast, the location information serves as one of the important judgment items as to which document processing module the user U1 should select, in the case where the document processing module is the scanner terminal, printer terminal, or facsimile terminal. This is because one of the input and output data treated by the document processing module is data recorded on non-electronic medium, such as paper.

Accordingly, the location information of each of the document processing modules 20 to 25 may be managed as processing attribute information.

The additional dialog unit 143 is a unit which is adapted to perform the above-mentioned additional dialog in response to the request sent from the client terminal 28.

The additional dialog has the following relationship with the dialog (basic dialog) conventionally employed. A basic dialog is performed in the following way. Specifically, GUI (Graphical User Interface), which is prevalently used in personal computers of nowadays (the terminal 28 is one of them), is originally an interactive interface. Accordingly, supposing that a document (for example, the document DC1) is being edited on a GUI screen by using a word processing software; a request for printing the document can be made intuitively by clicking an icon indicative of a printer terminal, the icon being provided on the tool bar displayed within the GUI screen, and, as necessary, further designating a desired printer terminal. If the power is not turned on at the printer terminal, an error message is displayed (basic dialog). The display of such an error message is realized in a manner that the personal computer communicates with the printer terminal and confirms the operational state of the printer terminal.

The additional dialog, which is performed chiefly by the additional dialog unit 143, is so configured as to be performed in linkage with the basic dialog, such as the above-mentioned display of an error message. Accordingly, it is preferred that the basic dialog and the additional dialog are recognized as seamless and unitary by the user U1, who operates the client terminal 28 and observes with his eyes the display unit (for example, an approximate 17-inch color display (bit map display)) of the client terminal 28.

Note that the basic dialog can be performed by using only the function of the client terminal 28; whereas for performing the additional dialog, the client terminal 28 needs to function in linkage with the document management terminal 27. For establishing this linkage, the additional dialog unit 143, in particular, plays a major role among the units in the document management terminal 27.

The additional dialog unit 143 obtains document attribute information in the following ways. Specifically, the additional dialog unit 143 can obtain document attribute information (here, the document attribute information AD1) by retrieving the document attribute registration unit 141 while employing the document identification information as a key. This is because, through the request made in the basic dialog, at least document identification information, which identifies the document (here, the document DC1), can be obtained on the basis of the intention of the user U1. While various types of information are employable for the document identification information, an example of the document identification information is the file name of the document DC1 (or a combination of: the file name; and the name of a host terminal of the client terminal 28, or the user ID of the user U1).

Further, the document DC1, which is edited by the user U1 on the client terminal 28, and the document DC1, which is registered in the document registration unit 140 of the document management terminal 27, should strictly correspond to (match) each other for meeting the need of so-called WYSIWYG (i.e. what you see is what you get). This correspondence (matching) can be realized through a remote operation in which editing of the document DC1 in the document management terminal 27 is performed via the transmission line 29 by operating the client terminal 28. Alternatively, the correspondence (matching) can be established in a manner that, when the content of the document DC1 in the client terminal 28 is changed, the change is immediately reflected in the document DC1 in the document registration unit 140.

The latter manner is more preferred because, in general, the former manner of employing a remote operation applies a greater load to the document management terminal 27 and increases the traffic volume flowing through the transmission line 29.

The additional dialog unit 143 obtains processing attribute information in the following ways. Specifically, where the request made in the basic dialog includes, in addition to the document identification information, processing identification information for identifying one of the document processing modules 20 to 26 to which a request for processing the document is sent; the additional dialog unit 143 can obtain processing attribute information of the device (for example, the printer terminal 20) designated by the user U1 by performing retrieval to the processing attribute registration unit 142 while employing the processing identification information as a key. Since processing identification information identifies each of the document processing modules; detailed functional specifications can be designated, and the location information of each of the document processing modules 20 to 26 can be designated, by using the processing identification information.

Even where the request made in the basic dialog does not include the processing identification information, the request includes basic function identification information, which allows the user U1 to identify his desired basic function (for example, printing, facsimile transmission, electronic mail transmission, or the like); accordingly, the additional dialog unit 143 can obtain processing identification information, which is further detailed information than the basic function identification information, on the basis of the basic function identification information.

As the way of obtaining the processing identification information in the case where the request does not include processing identification information, there can be mentioned: a way in which processing identification information to be used first is previously determined for each basic function identification information (linear designation method); and a way in which plural possible processing identification information are used concurrently (non-designation method).

In the linear designation method, when the user U1 cannot accept a result of the forecast (hereinafter, result of a forecast is referred to as "forecast result") presented first with respect to firstly used processing identification information (note that the forecast result is determined on the basis of a combination of processing attribute information and document attribute information), he can repeat sequentially an operation to cause a new forecast result, which is obtained with respect to the next used processing identification information, to be presented. In the non-designation method, a plurality of forecast results, which is obtained with respect to a plurality of processing identification information, are concurrently displayed on the display screen.

The document attribute information, which is obtained through retrieval executed to the document attribute registration unit 141 by the additional dialog unit 143, and the processing attribute information, which is obtained through a retrieval executed to the processing attribute registration unit 142 by the additional dialog unit 143, are supplied to the comparison forecast unit 144.

The comparison forecast unit 144 is a unit which is adapted: to compare the document attribute information and the processing attribute information thus received; to forecast what result will be obtained if the document (here, the document DC1) corresponding to the document attribute information is processed (for example, printing) by the document processing module (for example, terminal 22) corresponding to the processing attribute information; and to return the forecast result to the additional dialog unit 143.

After receiving the forecast result, the additional dialog unit 143 causes the GUI screen of the client terminal 28 to perform a screen display according to the forecast result.

Figure 20:
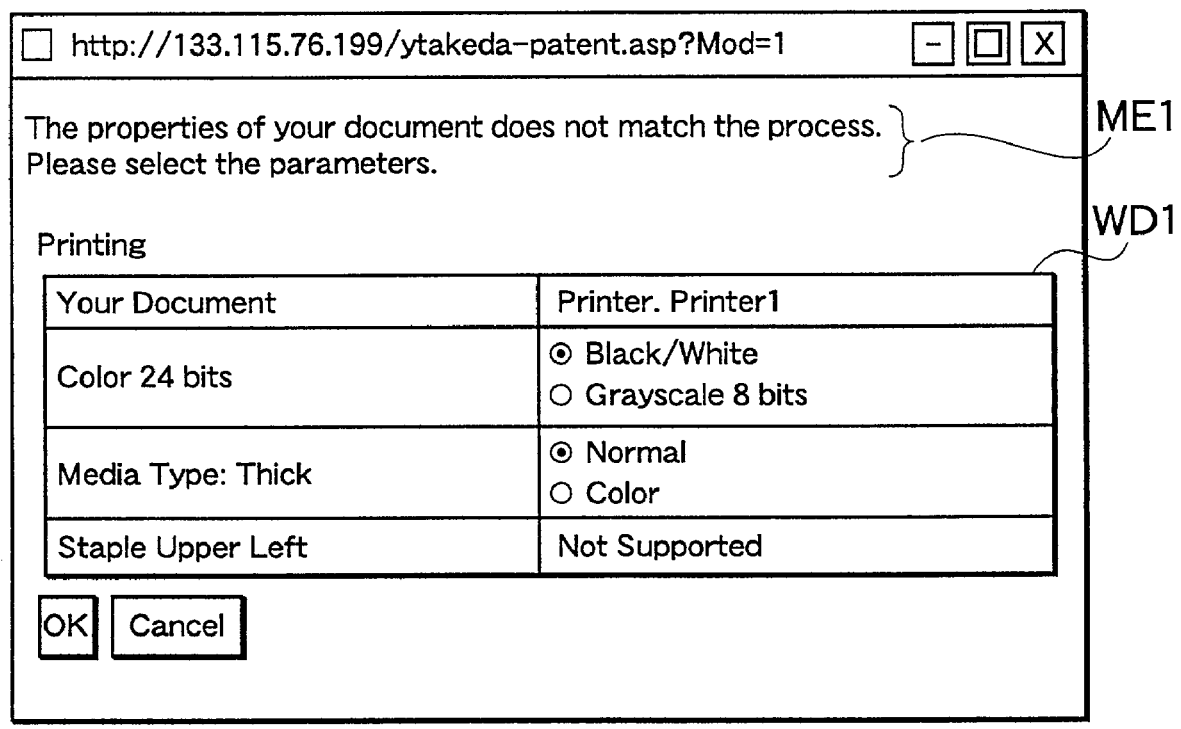
FIG. 20 is a schematic view showing still another example of error notification screen according to the embodiment of the present invention.

An example of the screen display performed at this time is shown in FIG. 20.

The GUI screen in FIG. 20 displays a message ME1 and a window WD1. The message ME1 indicates that the document attribute information and the processing attribute information do not match each other, and concurrently that, although the mismatching exists, he can continue his desired processing (here, printing); and urges the user to select other functional specifications if he wishes to continue the processing. The window WD1 is provided for allowing the user to select functional specifications out of the eligible functional specifications.

Specifically, in FIG. 20, the document attribute information of the document DC1 itself shows color of 24 bits, media type of thick, and staple position of upper left. By contrast, the processing attribute information of the printer terminal (for example, the printer terminal 22), which is designated at this occasion, shows: that the function of color printing is not provided, namely, only either binary value of black and white, or the gray scale of 8 bits can be used; that the media type is not thick, namely, only either one of normal or color can be used; and that stapling is not supported.

The message ME1 is displayed as a forecast result generated by the comparison forecast unit 144.

At this occasion, if necessary, the following configuration may be adopted. Specifically, instead of displaying the message ME1 consisting of only the character string as shown in FIG. 20, a preview screen is displayed for showing the outline of the general view of the document (if the document includes a plurality of pages, the general view of, for example, the first page) which will be obtained if the processing is actually executed.

If the user U1 observes the display screen shown in FIG. 20 with his eyes and regards as acceptable a combination of the displayed eligible functional specifications (for example, the combination of "Black/White" and "Normal" (and no support for stapling)) of the printer terminal 22; he selects, in the window WD1, the combination by filling the concerned blanks with buttons, and then operates the "OK" button. By contrast, if he cannot find an acceptable combination, he operates the "CANCEL" button.

When the "CANCEL" button is operated; in the case of the linear designation method, a new window is displayed for showing the next forecast result, which is obtained at the comparison forecast unit 144 on the basis of the next processing attribute information and the document attribute information; whereas in the case of non-designation method, a plurality of windows, each of which is similar to the window WD1, are displayed concurrently on the same GUI screen.

Note that it is preferred that, with respect to documents which the respective users wish to keep undisclosed, access control is applied so as to enable only specific allowed users to access such documents. This is because the document management terminal 27 is commonly used by a plurality of users (the user U1 is one of them) exiting in the document management system 10.

Hereinafter, operations of the document processing system according to the present embodiment, which has the above-mentioned constitution, will be described.

Figure 21:
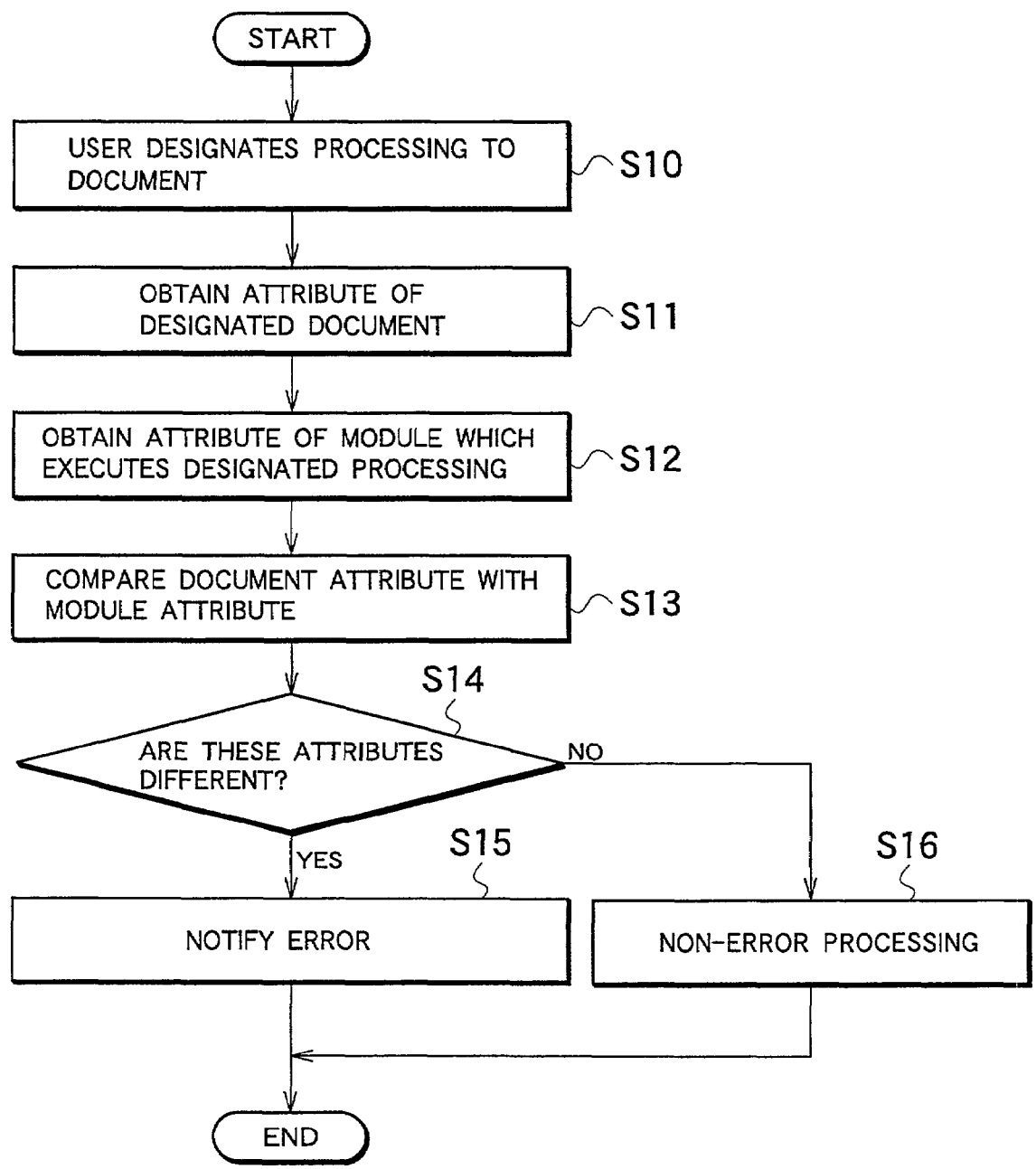
FIG. 21 is a flowchart showing a sequence of operations in the document processing system according to the embodiment of the present invention.

The basic operation of the document processing system according to the present embodiment is shown in the flowchart of FIG. 21. The flowchart of FIG. 21 consists of steps S10 to S16.

In FIG. 21, when the user U1 designates a document DC1 and processing for the document DC1 from the GUI screen of the client terminal 28 (S10), document identification information and processing identification information are obtained. Subsequently, the additional dialog unit 143 of the document management terminal 27 obtains, from the document attribute registration unit 141, document attribute information which is uniquely identified by the document identification information (S11); and also obtains, from the processing attribute registration unit 142, processing information which is uniquely identified by the processing identification information (S12).

Note that, since the designated document is the document DC1, the document attribute information thus obtained is the document attribute information AD1, as described above. Also, where the designated document processing module is the printer terminal 22, the processing attribute information thus obtained is the processing attribute information AP1, as described above.

Figure 16:
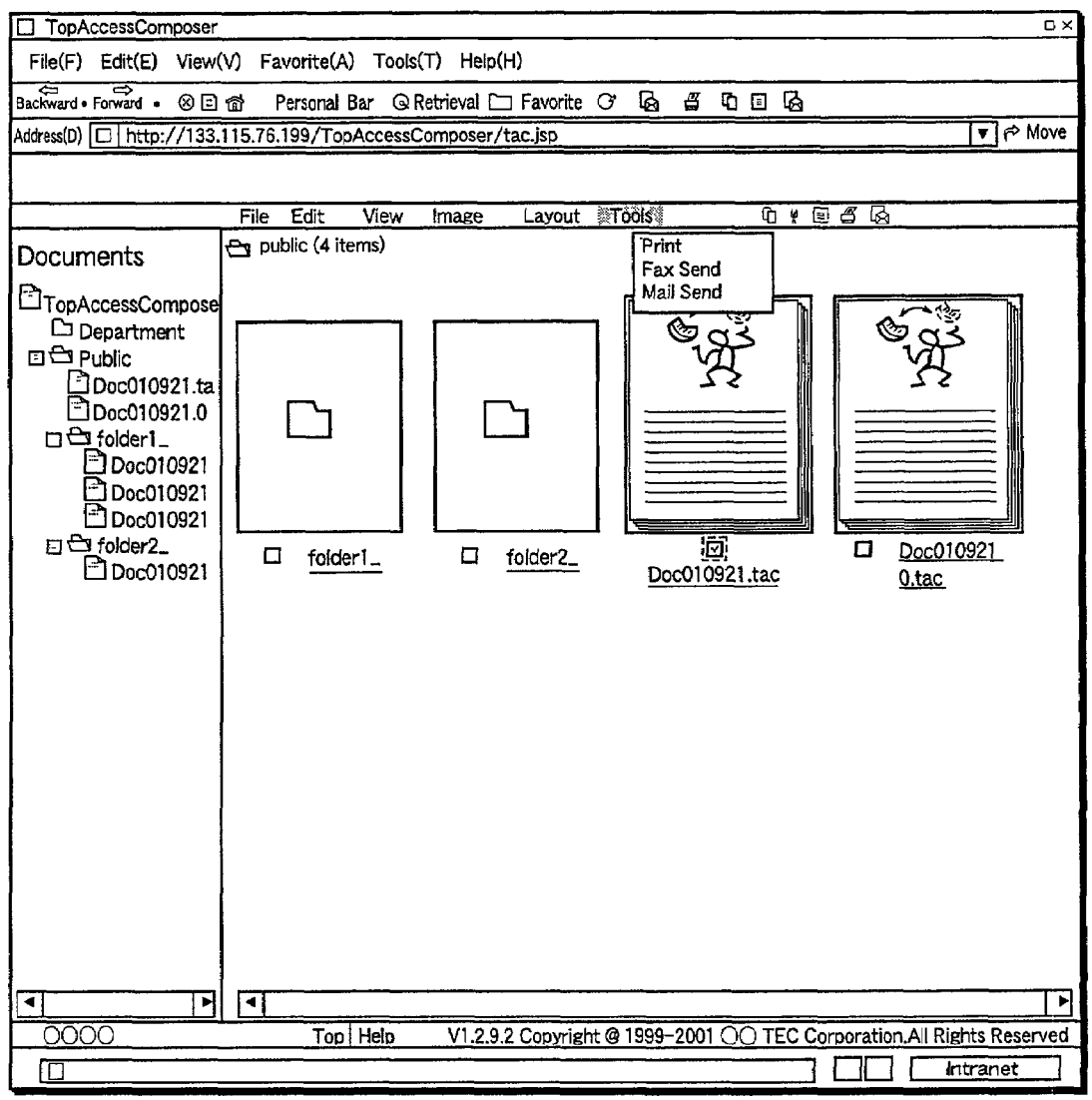
FIG. 16 is a schematic view showing an example of processing designation screen according to the embodiment of the present invention.

FIG. 16 shows an example of the GUI screen which is displayed at the client terminal 28 at the step S10.

As shown in FIG. 16, the GUI screen has: at the left region thereof, an area which shows the structure of folders (hereinafter, occasionally referred to as "folder displaying area"); and, at the right region thereof, an area which displays, in the form of images, the content of a folder currently selected (hereinafter, occasionally referred to as "content displaying area"). At the upper region thereof, a main command menu including menu items such as File, Edit, View, etc., each of which the user U1 can designate, is provided; and each menu item of the main command menu has a sub command menu including menu items related to the menu item of the main command menu.

Where a folder accommodates files each for a document, the files accommodated in the folder can be displayed in the right region, for example, by clicking the folder existing in the folder displaying area in the left region.

A folder is denoted by a folder mark and a folder name, whereas a document is denoted by a reduced image (which corresponds to the document data CC1 of the document DC1) and a document name (for example, a file name). On the left side of each folder name, a check box is provided in which a check is inserted when the document displayed in the display screen of the client terminal 28 is clicked. When a document is designated in the folder displaying area existing at the left region, the respective pages of the designated document are displayed in a manner that each designated page is accompanied by a check box.

Note that the displaying manners in the left and right regions are not restricted thereto, that is, any displaying manner is acceptable so long as the documents can be discriminated from one another and a document to be processed can be designated. For example, a list of pairs, each consisting only of a check box and a document name (a list of pairs, each consisting only of a check box and a page number), is employable.

At the region above the document displaying area (i.e., the content displaying area), a command menu area for displaying the menu items of a main command menu is provided, and each of the menu items can have a sub command menu, thereby ensuring that a series of functions are collected under one group, as described above. Note that the manners of displaying the command menus are not restricted thereto; that is, any displaying manner is employable so long as a desired processing can be designated.

For example, under the menu item of "Tools", which is a menu item of the main command menu, three menu items of "Print", "Fax Send", and "Mail Send", which are menu items of the sub command menu, are provided. If the user U1 wishes to send an electronic mail, he can designate electronic mail sending just by inserting a check in the check box displayed beside his desired document and clicking the menu item of "Mail Send". Not to mention, the number of documents which he can select is not restricted to one; that is, he can select a plurality of documents and then designate one processing concurrently with respect to the plurality of selected documents.

The document attribute information AD1 and the processing attribute information AP1, which are obtained at the steps S11 and S12, respectively, are supplied from the additional dialog unit 143 to the comparison forecast unit 144. The comparison forecast unit 144 compares the two types of information, and then returns a forecast result, which is obtained based on the comparison result, to the additional dialog unit 143; and then the additional dialog unit 143 returns the forecast result (or a signal according to the forecast result) to the client terminal 28 (S13).

The comparison at the step S13, which is executed between the document attribute information AD1 and the processing attribute information AP1, can be executed by comparing their corresponding tag names (attribute names) or the like. For example, where, with respect to the attribute "Resolution", "Properties" in the document attribute information AD1 shows that its attribute value is "1200" while "Capability" in the processing attribute information AP1 of the document processing module (printer terminal 22) shows that its attribute values are "300, 600"; the comparison therebetween reveals that the printing cannot be performed at the resolution of 1200 dpi and accordingly the quality of the image is deteriorated at the time of printing.

Further, where, with respect to the attribute "Staple", "Properties" of the document attribute information AD1 shows that a settable position is "UpperLeft" while Capability of the processing attribute information AP1 lacks the tag of "Staple", the comparison therebetween reveals that the printer terminal 22 does not have the stapling function itself.

If it is judged, at the step S14 performed subsequently to the step S13, that the document attribute information AD1 and the processing attribute information AP1 are completely different and accordingly there is no probability that the designated document can be processed at the designated document processing module (here, terminal 22); the processing proceeds to the side of "YES" to notify an error (S15). In this step of error notification (S15), the client terminal 28 displays a window for the error notification on the GUI screen as shown in, for example, FIG. 18.

As the case where there is no probability that the designated document can be processed at the designated document processing module, a case can be mentioned where the data form of the document DC1 is, for example, the PDF (Portable Document Format) form but the printer terminal 22 does not have the capability to process data of the PDF form.

Figure 18:
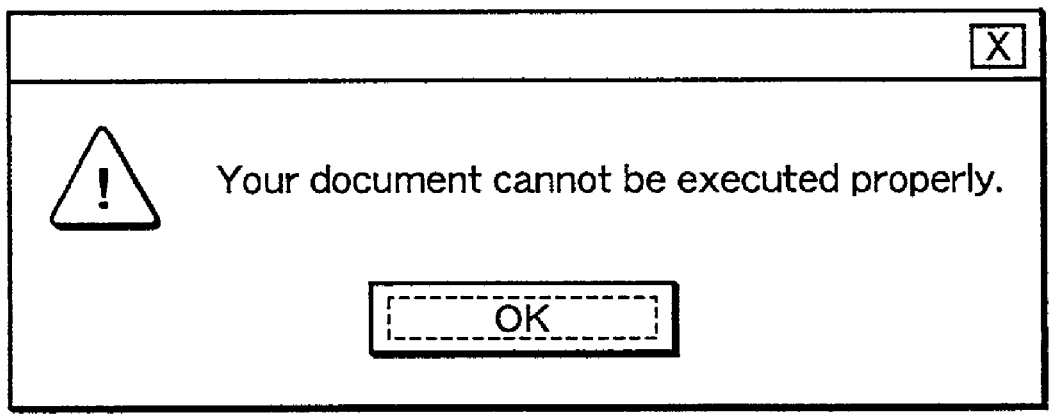
FIG. 18 is a schematic view showing an example of error notification screen according to the embodiment of the present invention.

In this case, if the printer terminal 22 does not have the capability to process PDF-form data but the printer terminal 23, which is another printer within the document processing system 10, has this capability, a notice may be displayed together with the window of FIG. 18 (or within the window). Here, the notice informs that, if the user U1 changes the designated printer from the originally designated printer 22 to the other printer 23, the printer 23 can process the data of that form.

Examples of the case, where there is no probability that the designated document can be processed at the designated document processing module, include: a case where the document processing module does not support the attribute of double-sided setting in the document attribute information; a case where the document processing module does not support the attribute of input tray in the document attribute information; a case where the document processing module does not support the attribute of output tray in the document attribute information; a case where the document processing module does not support the attribute of sheet type in the document attribute information; a case where the document processing module does not support the attribute of vertical and transversal mutual distinction in the document attribute information; a case where the attribute of number of copies to be printed in the document attribute information is larger than the maximum printable number of copies of a document processing module (in this case, printer terminal); a case where the attribute of number of pages of the document attribute information is larger than the maximum number of pages of the document processing module; a case where the document processing module does not support the attribute of sort mode in the document attribute information; a case where the document processing module does not support the attribute of stapling position in the document attribute information; a case where the document processing module does not support the attribute of hole punching position in the document attribute information; and a case where the attribute of data size in the document attribute information is larger than the maximum E-mail size of the document processing module.

Note that some of the above cases are, depending on circumstances, rather suitable for being treated as the subject of the dialog performed in a non-error processing (S16), which will be described later. For example, the above case associated with the inconsistency in the number of copies to be printed can be treated in the dialog performed in the non-error processing because it is not necessary that all the copies to be printed of the required number be printed at one time (because the required number of copies to be printed can be printed in plural installments). Accordingly, it is desirable that the type of a processing is determined according to the characteristics of the functional specification in the document attribute information and the purpose of the processing.

On the other hand, where the comparison between the document attribute information AD1 and the processing attribute AP1 reveals that there is a probability that the document DC1 can be processed at the printer terminal 22, the step S14 branches to the side of "NO", and the non-error processing is performed at step S16.

The contents of the non-error processing differ depending on the result of the comparison executed between the document attribute information AD1 and the processing attribute information AP1.

For example, in a case where the document attribute information AD1 and the processing attribute information AP1 are not completely consistent with each other, but printing can be performed with any ones of the eligible functional specifications contained in the processing attribute information AP1, the contents of the non-error processing include: displaying a screen for allowing the user U1 to select functional specifications out of the eligible functional specifications; determining a combination of functional specifications selected out of the eligible functional specifications through a dialog performed with the user U1 via the displayed screen; and performing print processing in accordance with the combination thus determined.

Figure 19:
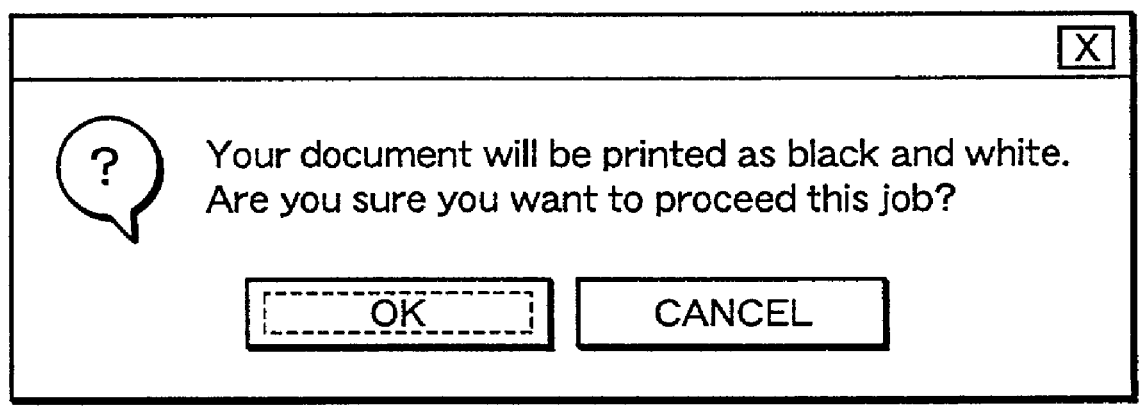
FIG. 19 is a schematic view showing another example of error notification screen according to the embodiment of the present invention.

FIG. 19 shows an example of the screen displayed at this occasion, which is another screen than the above-mentioned screen shown in FIG. 20. The screen in FIG. 19 displays a message, an "OK" button, and a "CANCEL" button. Here, the message informs: that, although the document data AD1 of the document DC1 shows the document DC1 is a colored one, the printer terminal 22 has only the functional specification of black and white printing; and that, if black and white printing is acceptable to the user U1, the print processing will be performed.

When the user U1 operates the "OK" button in this screen, the black and white printing will be performed; when the user U1 operates the "CANCEL" button, the processing will be cancelled.

In general, inconsistency between the document attribute information AD1 and the processing attribute information AP1 causes deterioration in quality of the finally obtained printed resultant.

In contrast, where the document attribute information AD1 and the processing attribute information AP1 are completely consistent with each other, and accordingly printing faithful to the document attribute information AD1 can be performed, the contents of the non-error processing include: notifying the fact of complete consistency to the user U1 on the GUI screen (alternatively, the fact may be notified that the system is already in the process of printing); and performing the print processing.

Not to mention, if necessary, even in the above case where the two types of information AD1 and AP1 are completely consist with each other, the intention of the user U1 may be reconfirmed by performing a dialog again.

Other examples of the case, where the document attribute information AD1 and the processing attribute information AP1 are not completely consistent with each other, but printing can be performed with any ones of the eligible functional specifications contained in the processing attribute information AP1, include: a case where the maximum manuscript size of the document processing module is smaller than the manuscript size of the document attribute information (because reduction of the image, or cutoff of a part of the image is needed); and a case where the maximum resolution of the document processing module is smaller than the resolution of the document attribute information.

Since the above-mentioned error notification performed at the step S15 allows the user U1 to dispense with performing unnecessary print processing, the user U1 can avoid an unfavorable situation in which he obtains, after consuming vainly time and cost on document processing such as print processing, an undesired resultant. Accordingly, an enhanced reliability is obtained.

Further, since, owing to the above-mentioned non-error processing performed at the step S16, the intention of the user U1 is reflected through a dialog in a detailed manner, the user U1 can obtain an acceptable processing resultant even where the processing attribute information is not completely consistent with the document attribute information. Accordingly, the operational load imposed on the user U1 is reduced, and flexibility and enhanced usability are obtained.

Unlike conventional art, in which the basic dialog, which corresponds to the above-mentioned steps S10 and S11, is immediately followed by a document processing (for example, print processing); the document processing system according to the present embodiment ensures that, subsequently to the basic dialog, the additional dialog can be performed at the steps S12 to S16, thereby enabling the user U1 to obtain the results produced at the steps S15 and S16 very efficiently.

As is clearly understood from the above descriptions, the document processing system of the present embodiment exhibits advantages of increasing reliability in operations and reducing the operational load imposed on the user.

Further, the document processing system of the present embodiment exhibits advantages of enhanced flexibility and enhanced usability.

Meanwhile, with respect to the system configuration, other configurations than that shown in FIG. 1 and described in the above-mentioned embodiment can be adopted. More particularly, in above-mentioned embodiment, constituent elements 20-28 are so configured as to be plural separate hardware devices which constitute one LAN as the entire document processing system 10, in which the document processing modules 20 to 26 are configured as terminals. However, the functional units can be provided in one hardware device (namely, in one information processing unit) in a manner that the functional units are arbitrarily combined and constituted as software modules or as hardware modules in the one hardware device.

This enables the system configurations shown in, for example, FIGS. 2 to 5 to be adopted.

Figure 2:
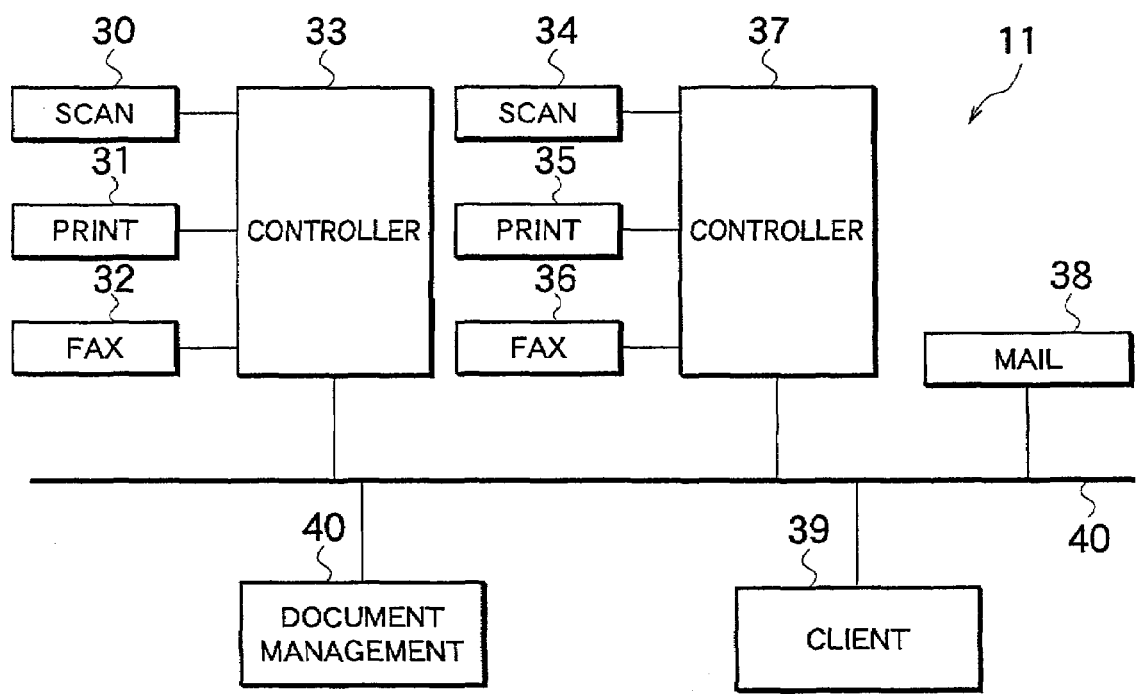
FIG. 2 is a schematic view showing another configuration of the document processing system according to the embodiment of the present invention.

In FIG. 2, the controller 33 is connected to the scanner module 30, the printer module 31, and the facsimile module 32, whereby these constituent elements 30 to 33 can be regarded as constituting one multi function peripheral (MFP). The term "multi function peripheral" as used herein refers to an office automation (OA) device which has two or more functions out of the functions of a printer, a facsimile machine, and a copy machine.

Figure 3:
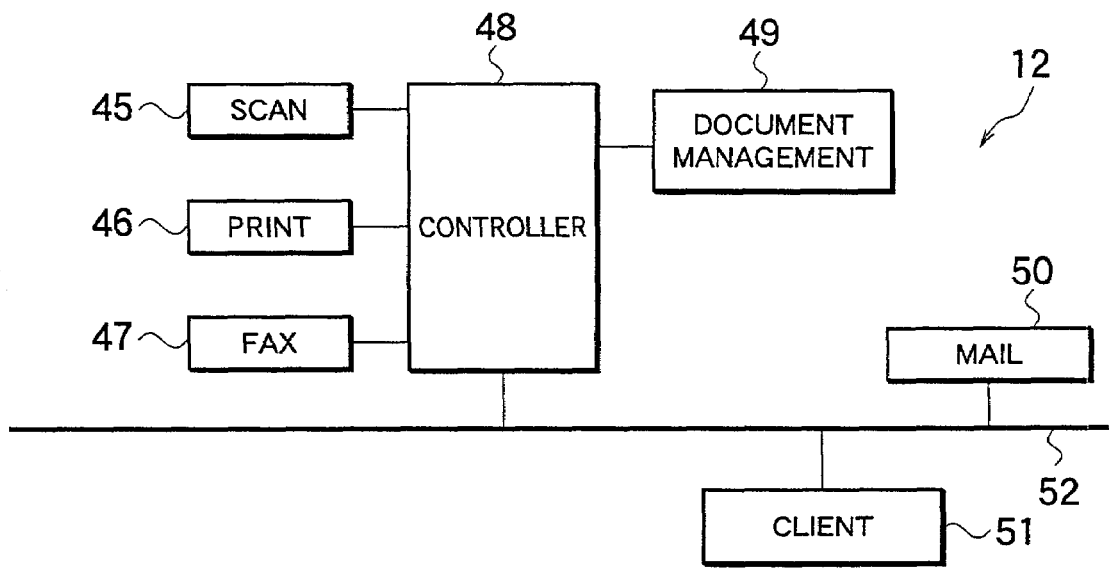
FIG. 3 is a schematic view showing still another configuration of the document processing system according to the embodiment of the present invention.

Similarly, the controller 37 shown in FIG. 2 is connected to a scanner module 34, a printer module 35, and a facsimile module 36, thereby constituting one multi function peripheral. Also, the controller 48 shown in FIG. 3 is connected to a scanner module 45, a printer module 46, and a facsimile module 47, thereby constituting one multi function peripheral. Note that, since the controller 48 is connected also to the document management module 49, which corresponds to the above-mentioned document management terminal 27, the multi function peripheral also has a document management function.

Figure 4:
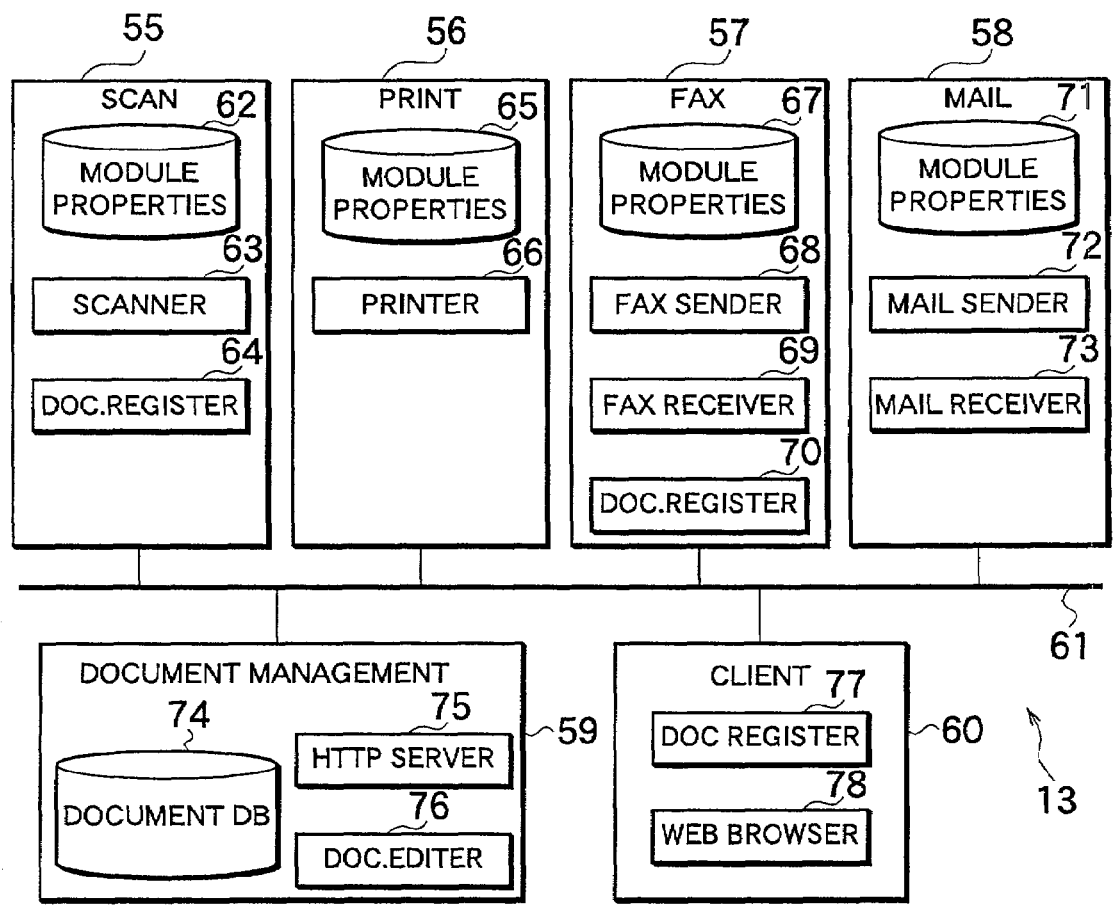
FIG. 4 is a schematic view showing still another configuration of the document processing system according to the embodiment of the present invention.

The configuration shown in FIG. 4 corresponds to the case where each of the document processing modules 20 to 26 in the above-mentioned embodiment has a function of sending its own processing attribute information through autonegotiation or the like.

In FIG. 4, each of the document processing modules 55 to 58 accumulates its own processing attribute information, whereby each of the modules 55 to 58 can provide the processing attribute information in response to a request (inquiry) made from the outside.

Figure 5:
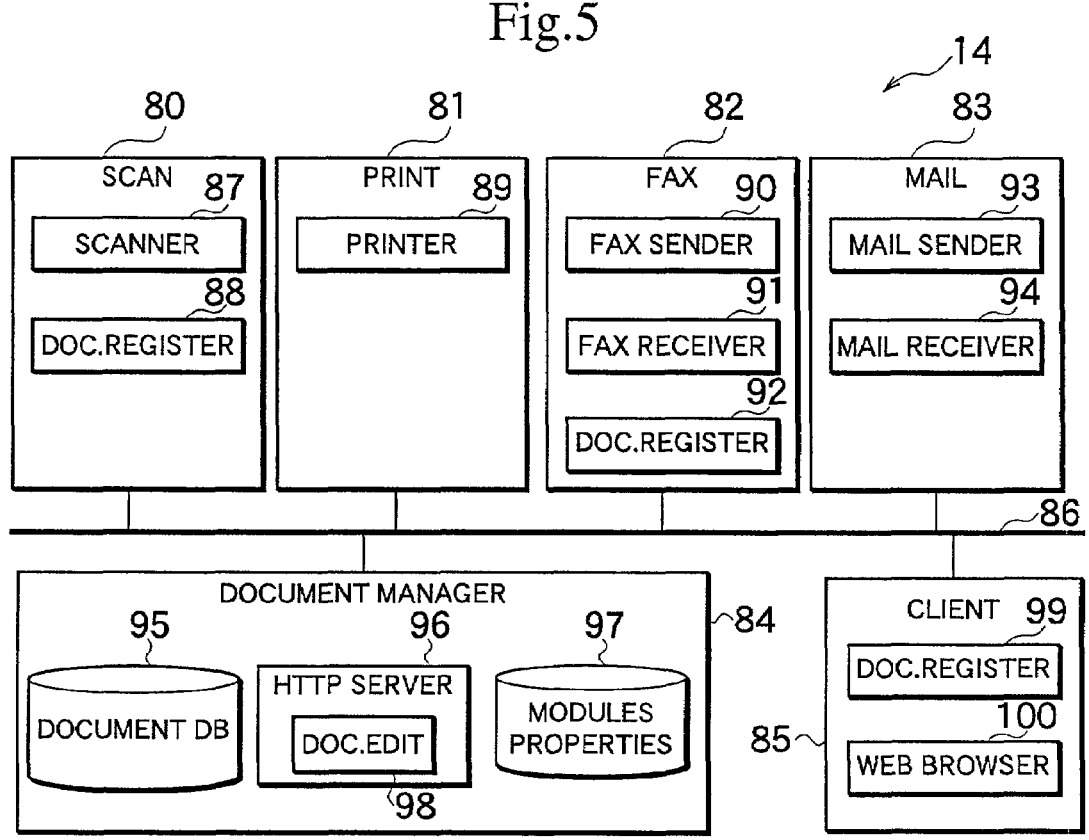
FIG. 5 is a schematic view showing still another configuration of the document processing system according to the embodiment of the present invention.
Figure 6:
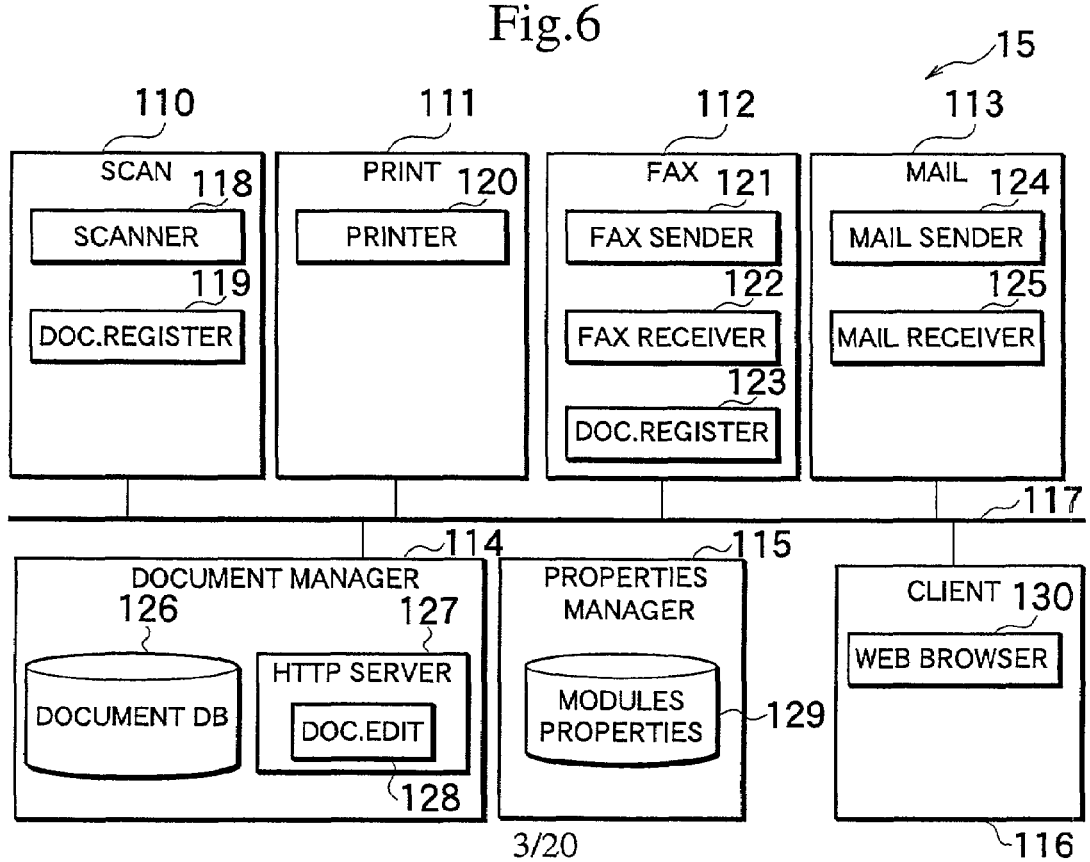
FIG. 6 is a schematic view showing still another configuration of the document processing system according to the embodiment of the present invention.

Further, according to the configuration shown in FIG. 4, the document management terminal (document management module) 59 has an HTTP (hypertext transfer protocol) server function 75, so that the client terminal 60 can gain access to the HTTP server function 75 by using the web browser 78 of its own. In this respect, the configuration of FIG. 5 is the same as that of FIG. 4.

Further, according to the configuration of FIG. 4, the document management terminal 59 also has the document editing function 76. Here, the document editing function 76 is a function of executing document combine processing.

The term "document combine processing" as used herein refers to a processing of combining a document with another document to generate a new document. A document of combine-source and a document of combine-destination (the term "document of combine-source" refers to a document which serves as the subject in a document combine processing while the term "document of combine-destination" refers to a document which serves as the object in a document combine processing), which are to be combined with each other through the document combine processing, are not always consistent in document attribute information with each other. Accordingly, there may arise the same problem as occurs between the document attribute information and the processing attribute information.

Figure 26:
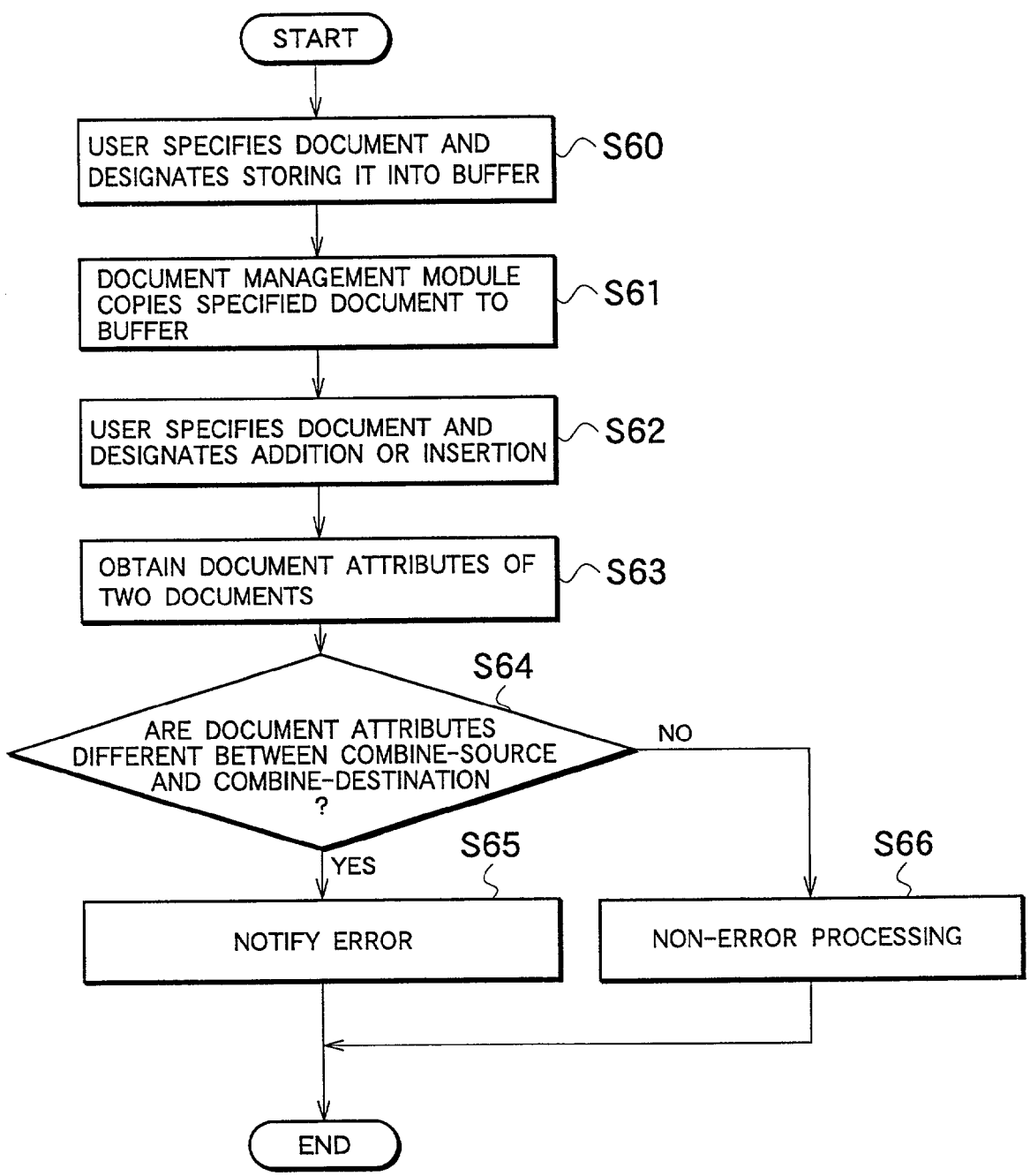
FIG. 26 is a flowchart showing still another sequence of operations in the document processing system according to the embodiment of the present invention.

FIG. 26 is a flowchart which shows the document combine processing. This flowchart contains steps S60 to S66.

In FIG. 26, the document combine processing is performed in a manner that documents to be combined are specified one by one. First, the user specifies, from the editing screen, a document to be combine-source, and designates storing the specified document in the buffer (Copy). In response to this designation, the document management module stores the specified document in the buffer. Subsequently, the user specifies a document to be combine-destination, and designates insertion or addition. Here, the number of the documents of combine-destination may be one, or any number of two or more. In response to this designation, the document management module 59 compares the attributes of the document stored in the buffer with the attributes of the document specified as combine-destination, so as to judge whether or not a difference exists between the two types of attributes. Depending on the result of the judgment, the processing shown at the steps S64 to S66, which is similar to the above-mentioned steps S14 to S16 shown in FIG. 21, is executed.

Figure 17:
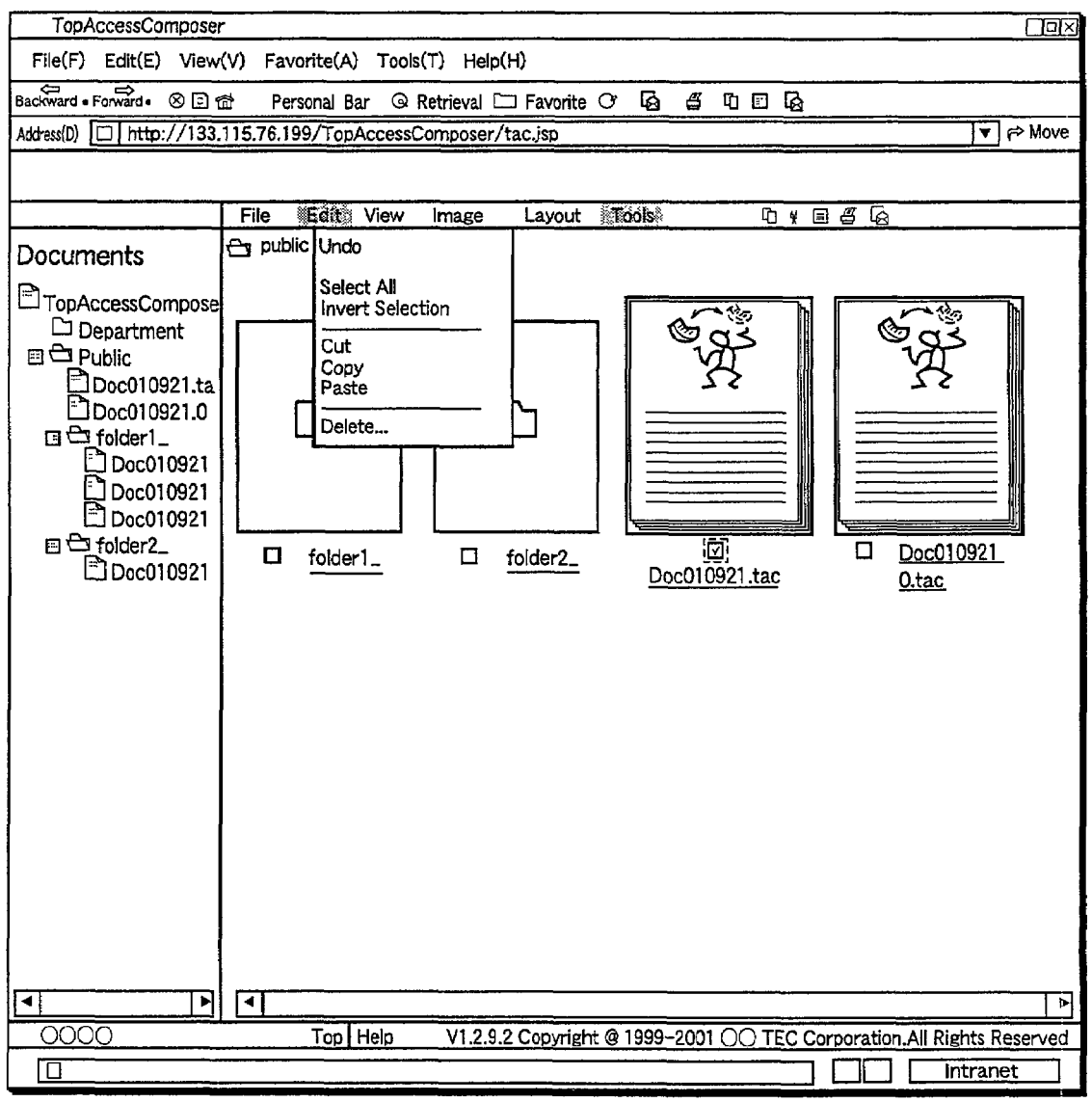
FIG. 17 is a schematic view showing an example of document editing screen according to the embodiment of the present invention.

FIG. 17 shows an example of a GUI screen of the client terminal 60 displayed when the document combine processing is executed.

The screen shown in FIG. 17 is configured similarly to the screen shown in FIG. 16, which is employed in the above-mentioned embodiment, so that the document combine processing can be performed in similar manners.

For example, the document combine processing can be performed by: specifying a document and selecting the item "Copy" to accumulate the data of the document in the inside buffer provided in the document management module; and then specifying another document and selecting the item Paste to add the data of the document stored in the inside buffer.

The document combine processing can be performed by way of other procedures. For example, the document combine processing can be performed in a manner that, when the user selects a plurality of documents on the editing screen of the client terminal 60 and designates combining of these documents, the document management module 59 compares the document attributes among the plurality of documents thus selected to find out the differences thereamong, and performs subsequent processings according to the result of the comparison.

The procedure, which is adopted when the document combine processing is actually performed, can be determined depending on circumstances. Specifically, the document arrangement module 59 may perform the document combine processing in a manner that the module 59 causes the processing to proceed in accordance with a predetermined rule, or alternatively in a manner that the module 59 determines the procedure while making inquiries to the user.

In the latter manner in which the procedure is determined while making inquiries to the user, a configuration may be adopted in which, only when an inconsistency between the documents exists between the documents, the fact that the inconsistency exists is notified to the user.

As the case where such an inconsistency occurs, the following cases can be mentioned:

1) "Double-sided setting" is designated for the document of combine-source, whereas "single-sided setting" is designated for the document of combine-destination;

2) Between the document of combine-source and the document of combine-destination, a difference exists in the attribute "input tray";

3) Between the document of combine-source and the document of combine-destination, a difference exists in the attribute "output tray";

4) Between the document of combine-source and the document of combine-destination, a difference exists in the attribute "sheet type";

5) Between the document of combine-source and the document of combine-destination, a difference exists in the attribute "vertical and transversal mutual distinction";

6) Between the document of combine-source and the document of combine-destination, a difference exists in the attribute "number of copies to be printed";

7) Between the document of combine-source and the document of combine-destination, a difference exists in the attribute "sort mode";

8) Between the document of combine-source and the document of combine-destination, a difference exists in the attribute "position for stapling";

9) Between the document of combine-source and the document of combine-destination, a difference exists in the attribute "position for hole punching"; and 10) Between the document of combine-source and the document of combine-destination, a difference exists in the attribute "person of destination of facsimile or E-mail transmission".

Further, with respect to the following cases, a notification to the user may be performed. This is because, although inconsistency does not occur even when the document combine processing is performed without any notification to the user, it may happen that the contents of the document leaks out (i.e., the secrecy of the document is divulged) unintentionally when the combined document (i.e. document obtained after the document combine processing) is processed.

11) Between the document of combine-source and the document of combine-destination, "receivers of facsimile or E-mail transmission" are different; and 12) Between the document of combine-source and the document of combine-destination, "destinations of broadcast communication (i.e., multi-destination delivery)" are different.

In any of the above cases, after the notification to the user is made, when the user instructs the system to proceed with the processing (document combine processing), or when the user sets a different attribute value and then instructs the system to proceed with the processing; combining the documents is performed, in accordance with the predetermined processing, or by using the attribute value specified by the user. When the user instructs the system to interrupt the processing, the document combine processing is not performed.

Note that the configuration of FIG. 4, in which the document editing function 76 is provided in the document management module 59, implicitly shows that the document editing function 76 can cope with document combine processings executed for documents having any document attribute information.

As necessary, the document editing function 76 may be provided outside the document management module 59. In such a case, there may arises a problem related to consistency between: the processing attribute information of the document editing function 76 itself; and the document attribute information of the document of combine-source or combine-destination. In such a case, the problem can be solved by performing an appropriate processing similar to the processing employed in the above-mentioned embodiment depending on degree of inconsistency.

Figure 27:
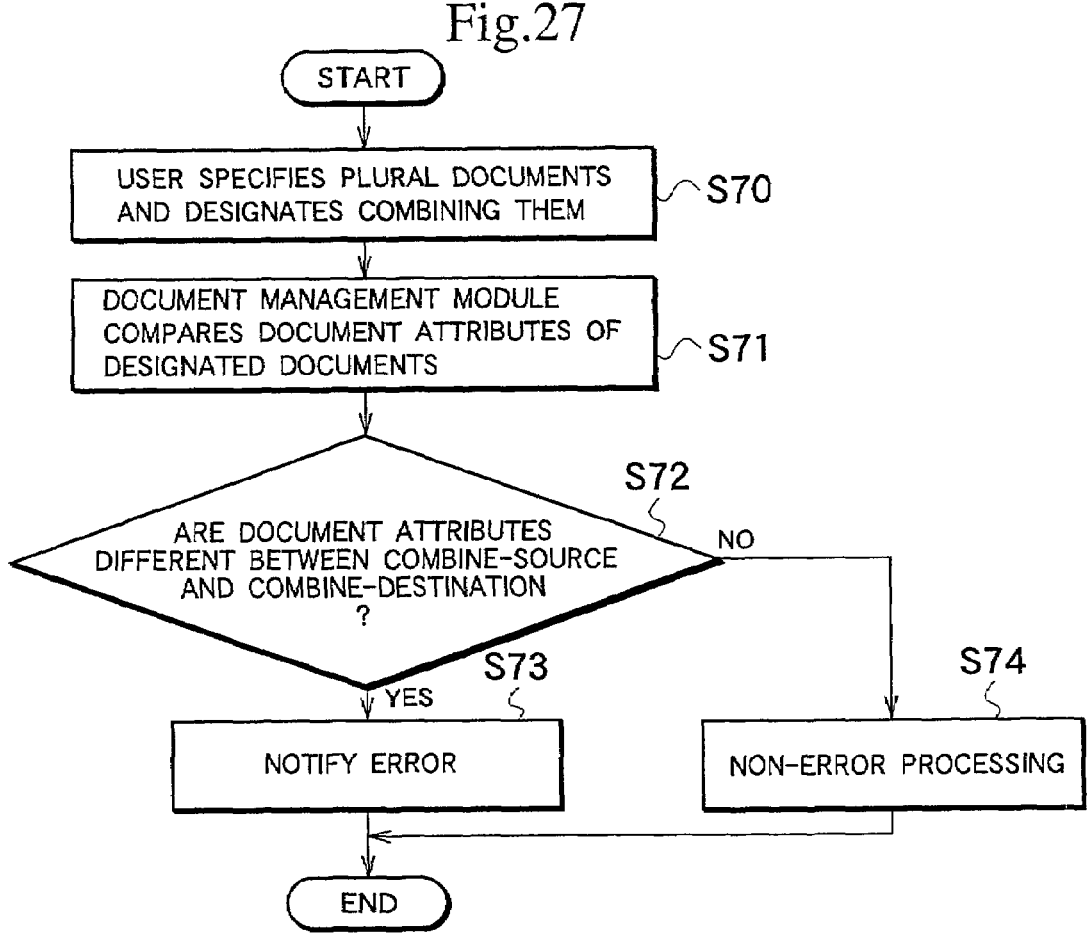
FIG. 27 is a flowchart showing still another sequence of operations in the document processing system according to the embodiment of the present invention.

The flowchart of FIG. 27, which is similar to the flowchart of FIG. 26, shows a document combine processing other than the document combine processing of FIG. 26. The only difference of FIG. 27 from FIG. 26 is that the user specifies, when he designates the document combine processing, a plurality of documents at a time.

Meanwhile, with respect to the operation of the data processing system according the above-mentioned embodiment, in place of the flowchart shown in FIG. 21 employed in the above-mentioned embodiment, the flowcharts shown in FIGS. 22 to 25 can be employed.

Although the flowcharts in FIGS. 22 to 25 are basically the same as the flowchart in FIG. 21, there are some minor differences therebetween.

Figure 22:
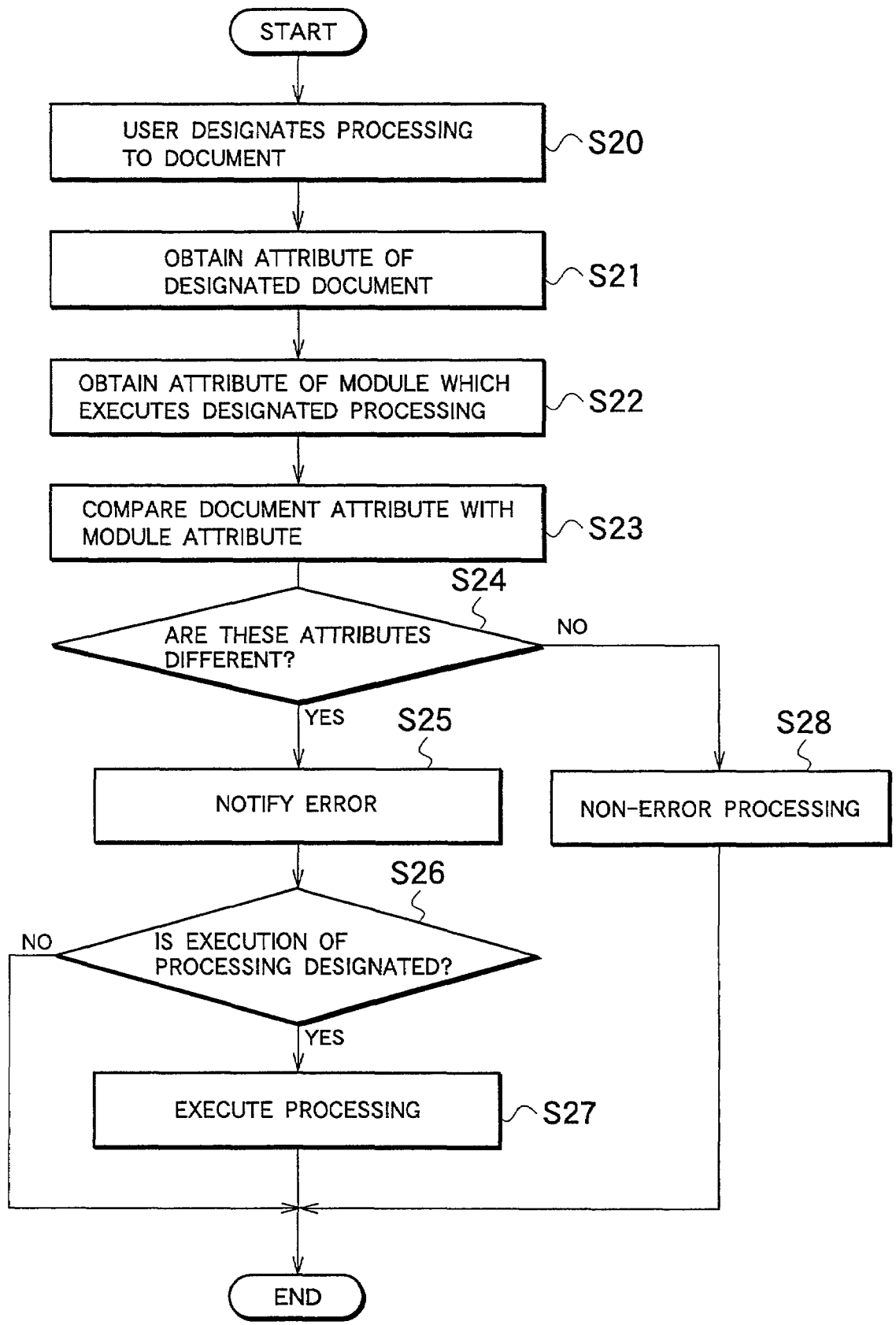
FIG. 22 is a flowchart showing another sequence of operations in the document processing system according to the embodiment of the present invention.

Specifically, the flowchart of FIG. 22 is different from that of FIG. 21 in the steps related to error notification. Specifically, the flowchart of FIG. 22 is obtained by replacing a part of the error notification step (step S15) in FIG. 21, which is shown as one step in FIG. 21 but actually constituted by several sub steps, with other steps.

Figure 23:
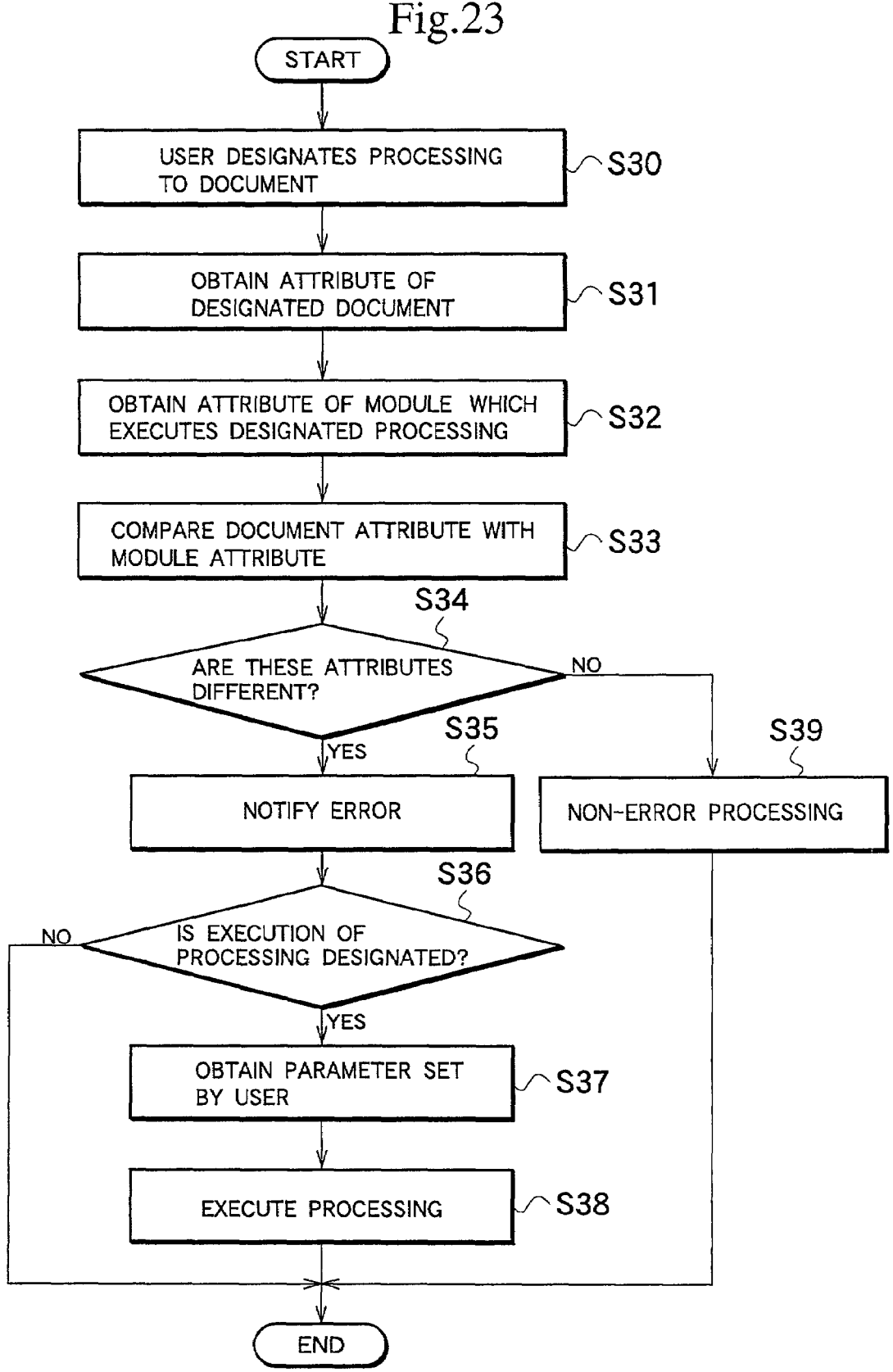
FIG. 23 is a flowchart showing still another sequence of operations in the document processing system according to the embodiment of the present invention.

Note that the error notification at the step S15 in FIG. 21 is performed in the case where there is no probability that the document designated by the user can be processed by the designated document processing module; whereas the error notification at step S25 in FIG. 22 is performed in the case where there is some probability that the document designated by the user can be processed by the designated document processing module. In this respect, the error notification at step S35 in FIG. 23 is the same as that at the step S25 in FIG. 22.

For the above reason, even after error notification is performed, the processings at steps S27 and S38, and the setting of parameters at step S37 can be performed. An example of the way of setting parameters is to insert buttons in the desired blanks displayed in the window WD1 in FIG. 20, as is already explained.

Figure 24:
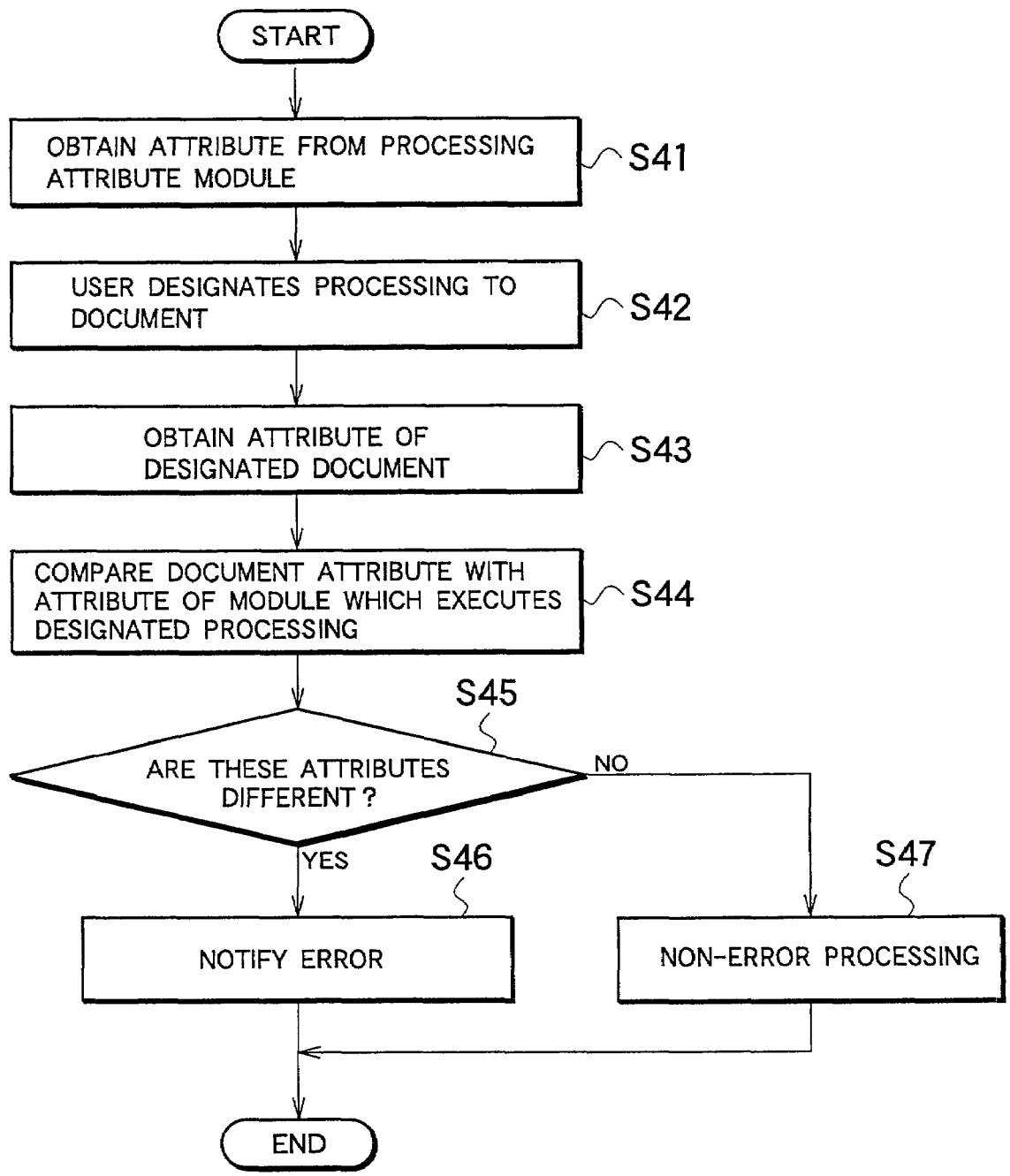
FIG. 24 is a flowchart showing still another sequence of operations in the document processing system according to the embodiment of the present invention.

Further, the flowchart in FIG. 24 corresponds to the case where each of the document processing module provides processing attribute information of its own. In FIG. 24, at step S41, each of the document processing modules provides the processing attribute information of its own to the document management module.

Figure 25:
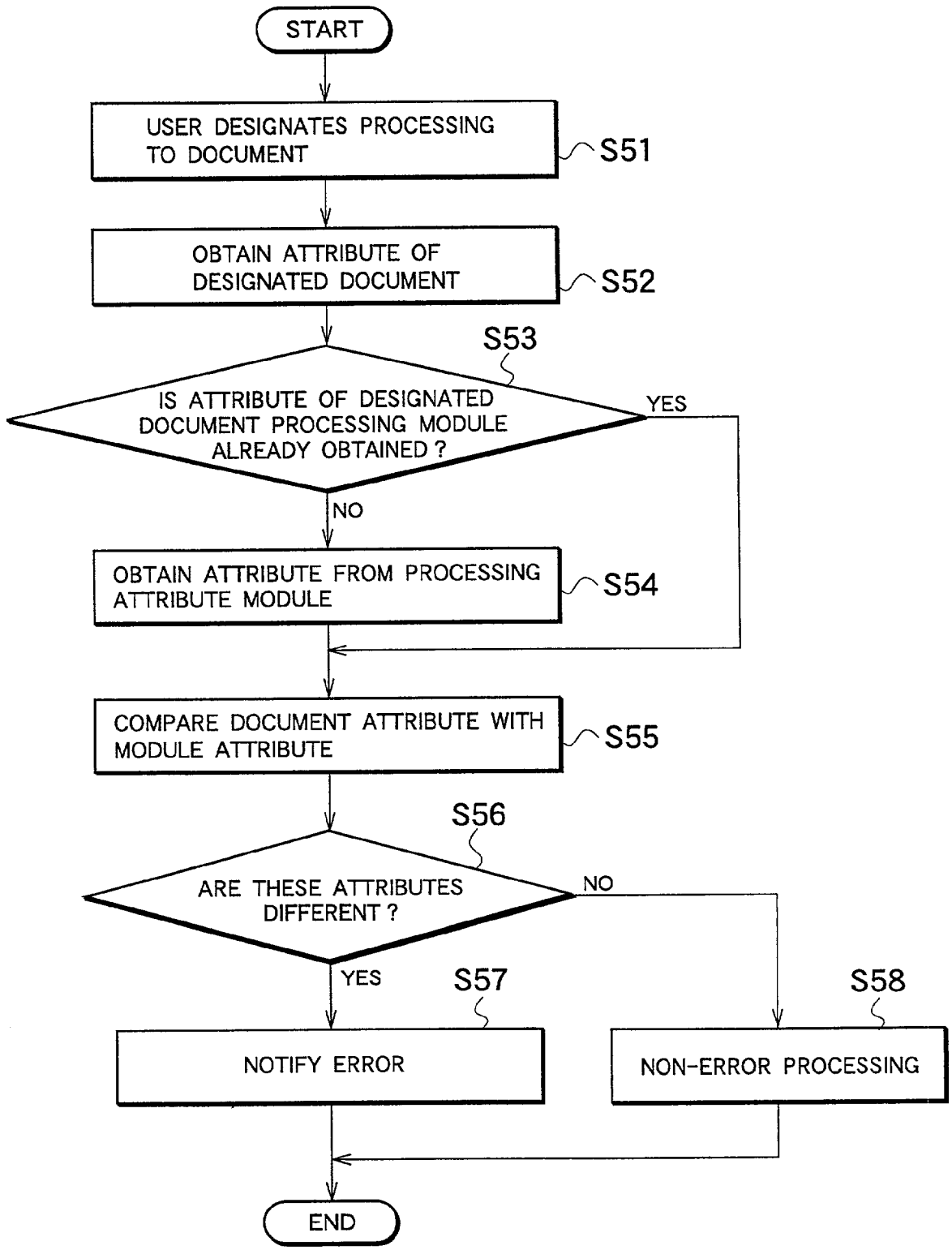
FIG. 25 is a flowchart showing still another sequence of operations in the document processing system according to the embodiment of the present invention.
Figure 29:
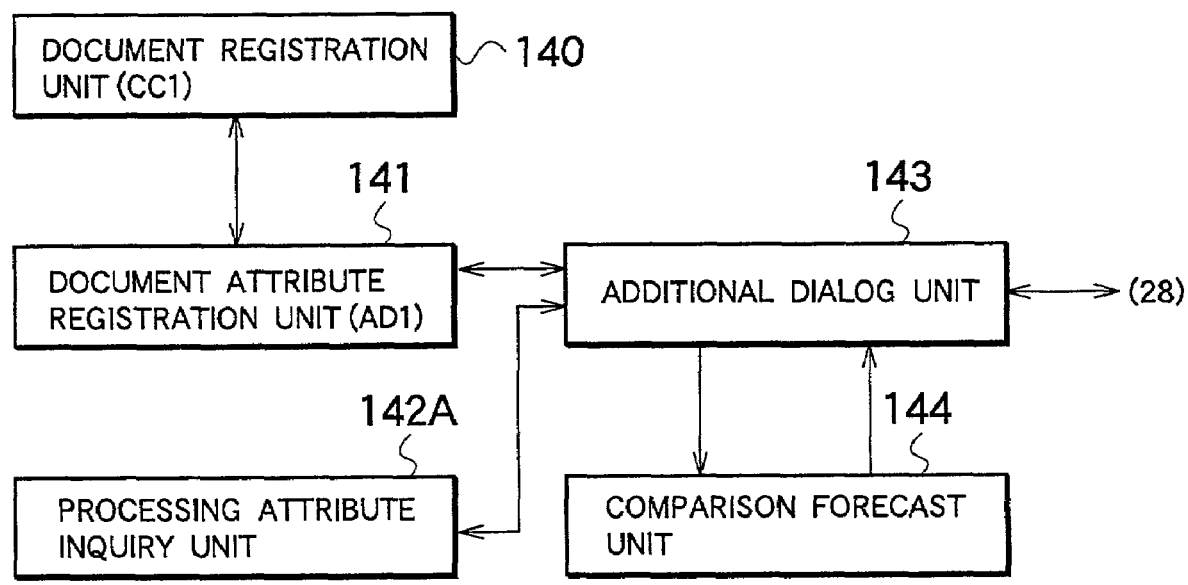
FIG. 29 is a schematic view showing another configuration of the main portion of a document management terminal (document management module) according to the embodiment of the present invention.

Meanwhile, with respect to obtaining processing attribute information, in the above-mentioned embodiment, the setting of the processing attribute information to the processing attribute registration unit 142 can be omitted owing to autonegotiation so that the processing can be simplified. By contrast, where the document processing module can provide processing attribute information of its own, a configuration may be adopted in which, each time a necessity arises, the document management module obtains processing attribute information from the document processing module by making an inquiry to the document processing module. The step S54 in the flowchart of FIG. 25 is the step of obtaining processing attribute information in this case. The step S54 is performed after the step S53 in which it is confirmed whether or not the attribute information of the designated processing module has been obtained. FIG. 29 shows an example of the configuration of the document management terminal in this case.

The constituent elements in FIG. 29 have the same functions as the constituent elements denoted by the same reference numerals in FIG. 28. Accordingly, the FIGS. 29 and 28 are different only in the features related to the processing attribute inquiry unit 142A. The processing attribute inquiry unit 142A obtains processing attribute information from the document processing module each time a necessity arises, whereby the real-time state of the document processing module and document attribute information can be compared.

For example, where running-out of sheets occurs at the input cassette of the printer terminal, the value denoting the sheet size of the run-out sheet is removed from Capability, thereby enabling the document management module to make a judgment that another printing module should be used.

Note that this way, in which processing attribute information is obtained by making an inquiry each time a necessity arises, may apply a large load on the transmission line (for example, transmission line 61 in fig. FIG. 4) or on the document processing modules (for example, modules 55 to 58 in FIG. 4) when the traffic volume within the document processing system is large. Accordingly, the way of previously registering processing attribute information is more advantageous in that the document attribute information can be obtained when the traffic volume is small.

In actual operations, it is effective to configure, by mixing these ways, the system in the following manner. Specifically, processing attribute information as to all the document processing modules is previously registered. Thereafter, when the traffic volume is small, processing attribute information is obtained through inquiry; by contrast, when the traffic is large, the processing attribute information previously registered is used.

Further, as in the step S53, it is effective, in terms of preventing the traffic volume from becoming too large, to confirm whether or not the processing attribute information is already obtained, and then obtain the information only when the information has not been obtained yet.

Furthermore, if, when the inquiry is made, there is processing attribute information whose length of time elapsed after the obtaining of the information exceeds a predetermined value, a judgment is made that the information "has not been obtained yet", and another inquiry is made to obtain latest information. This configuration ensures that the latest information of the document processing module can be obtained while suppressing, to a certain degree, an increase in the traffic volume in the network.

The way of obtaining processing attribute information by making an inquiry can reduce the load imposed on the network traffic because the inquiry itself is not made with respect to unused document processing modules.

What is claimed is:

1. A data processing system in which data to be processed is managed as processing-object data, and the processing-object data is processed in response to a designation, comprising:

data management means for managing the processing-object data together with processing-object attribute information indicative of an attribute thereof;

processing designation means for designating a processing with respect to the processing-object data through a dialog performed with the user;

processing execution means for executing a processing of the processing-object data in response to a designation performed by the processing designation means; and first processing result forecasting means for executing, when the dialog is performed, a forecast on a result of the processing by comparing processing-subject attribute information, which indicates an attribute of a processing to be executed by the processing execution means, with the processing-object attribute information, and for outputting to the user forecast notification information in accordance with the result of the processing obtained through the forecast, wherein the processing designation means includes a designation alteration coping portion for generating a new designation in accordance with a dialog performed with the user who has responded, after the forecast notification information is outputted, to the content of the forecast notification information, wherein, where the processing executing means is a data editing terminal which combines a plurality of processing-object data by combining the processing-object data with other processing-object data in a manner that the former and latter processing-object data are determined as combine-source and combine-destination, respectively, the first processing result forecasting means forecasts a result of the processing by performing comparison between: processing-object information of the processing-object data of the combine-destination, in addition to the processing-subject attribute information of the data editing terminal; and the processing-object attribute information of processing-object data of the combine-source.

2. The data processing system according to claim 1, wherein the designation alteration coping portion includes a designation alteration supporting portion for supporting a dialog, which is performed when the user performs a new designation, by presenting a set of eligible attributes when there are a plurality of eligible attributes falling within the same category in the processing-subject attribute information of the processing execution means.

3. The data processing system according to claim 1, wherein the forecast notification information is quality alteration notifying information which notifies that, when the processing-object data is processed by the processing execution means, the quality of the result of the processing becomes different from the quality indicated by the processing-object attribute information.

4. The data processing system according to claim 1, wherein the forecast notification information is execution impossibility notification information which notifies that the processing execution means cannot execute the processing, itself, of the processing-object data.

5. The data processing system according to claim 1, wherein the processing execution means is any one of a printer terminal, a facsimile terminal, and an electronic mail terminal.

6. The data processing system according to claim 1, wherein the processing-subject attribute information to be compared with the processing-object attribute information is obtained statically beforehand, or obtained dynamically during the dialog.

7. The data processing system according to claim 1, further comprising:

data editing means for performing a combining processing in which the processing-object data, which serves as combine-source, is combined with other processing-object data, which serves as combine-destination; and second processing result forecasting means for forecasting, when the dialog is performed, a result of the processing by comparing the processing-object attribute information of combine-destination with the processing-object attribute information of combine-source, and for outputting to the user forecast notification information in accordance with the result of the processing thus forecasted.

8. A data processing method in which data to be processed is managed as processing-object data, and the processing-object data is processed in response to a designation, comprising:

managing the processing-object data together with processing-object attribute information indicative of an attribute thereof by using data management means;

designating a processing with respect to the processing-object data through a dialog performed with the user using a processing designation means;

executing a processing, using a processing execution means, of the processing-object data in response to a designation performed by the processing designation means;

executing a forecast, which is executed by first processing result forecasting means when the dialog is performed, on a result of the processing by comparing processing-subject attribute information, which indicates an attribute of a processing to be executed by the processing execution means, with the processing-object attribute information, and outputting to the user forecast notification information in accordance with the result of the processing obtained through the forecast; and generating, using a designation alteration coping portion provided in the processing designation means, a new designation in accordance with a dialog performed with the user who has responded, after the forecast notification information is outputted, to the content of the forecast notification information, wherein, where the processing executing means is a data editing function unit which combines a plurality of processing-object data by combining the processing-object data with other processing-object data in a manner that the former and latter processing-object data are determined as combine-source and combine-destination, respectively, the first processing result forecasting means forecasts a result of the processing by performing comparison between: in addition to the processing-subject attribute information of the data editing function unit, processing-object information of the processing-object data of the combine-destination; and the processing-object attribute information of processing-object data of the combine-source.

9. The data processing method according to claim 8, wherein the designation alteration coping portion supports a dialog, which is performed with the user for generating a new designation, by presenting a set of eligible attributes when there are a plurality of eligible attributes falling within the same category in the processing-subject attribute information of the processing execution means.

10. The data processing method according to claim 8, wherein the forecast notification information is quality alteration notification information which notifies that, when the processing-object data is processed by the processing execution means, the quality of the result of the processing becomes different from the quality indicated by the processing-object attribute information.

11. The data processing method according to claim 8, wherein the forecast notification information is execution impossibility notification information which notifies that the processing execution means cannot execute the processing, itself, of the processing-object data.

12. The data processing method according to claim 8, wherein the processing execution means is any one of a printer function unit, a facsimile function unit, and an electronic mail function unit.

13. The data processing method according to claim 8, wherein the processing-subject attribute information to be compared with the processing-object attribute information is obtained statically beforehand, or obtained dynamically during the dialog.

14. The data processing method according to claim 8, further comprising:

executing a combine processing, which is executed by a data editing function unit in response to the designation executed by the processing designation means, for combining the processing-object data with other processing-object data in a manner that the former and latter processing-object data are determined as combine-source and combine-destination, respectively; and executing, when the dialog is performed, a forecast on a result of the processing by comparing the processing-object attribute information of combine-destination with the processing-object attribute information of combine-source, the forecast being performed by the data editing function unit in response to a designation executed by the processing designating means, and outputting to the user forecast notification information in accordance with the result of the processing obtained through the forecast.

* * * * *